United States Patent
Shiokawa et al.

(10) Patent No.: US 8,437,615 B2
(45) Date of Patent: May 7, 2013

(54) DATA RECORDING METHOD

(75) Inventors: Junji Shiokawa, Chigasaki (JP); Hiroo Okamoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1062 days.

(21) Appl. No.: 11/874,285

(22) Filed: Oct. 18, 2007

(65) Prior Publication Data

US 2008/0240678 A1    Oct. 2, 2008

(30) Foreign Application Priority Data

Mar. 30, 2007  (JP) .................................. 2007-090210

(51) Int. Cl.
  *H04N 9/80*  (2006.01)
(52) U.S. Cl.
  USPC ............................. 386/248; 386/241; 386/239
(58) Field of Classification Search ........................ None
  See application file for complete search history.

(56) References Cited

U.S. PATENT DOCUMENTS

| 6,580,869 | B1 | 6/2003 | Ando et al. | |
|---|---|---|---|---|
| 2005/0123272 | A1* | 6/2005 | Kanai et al. | 386/52 |
| 2006/0211370 | A1* | 9/2006 | Hasegawa et al. | 455/3.06 |
| 2007/0098366 | A1* | 5/2007 | Nakashika et al. | 386/95 |

FOREIGN PATENT DOCUMENTS

| JP | 2000-152180 | 5/2000 |
|---|---|---|
| JP | 2000-236496 | 8/2000 |
| JP | 2001-101840 | 4/2001 |
| JP | 2002-300519 | 10/2002 |
| JP | 2002-369131 | 12/2002 |
| JP | 2003-153140 | 5/2003 |
| JP | 2003-331520 | 11/2003 |
| JP | 2005-038558 | 2/2005 |
| JP | 2005-332511 | 12/2005 |
| JP | 2006-004486 | 1/2006 |
| JP | 2006-271011 | 10/2006 |
| JP | 2007-048378 | 2/2007 |
| KR | 2000-0074306 | 12/2000 |
| KR | 10-2004-0016992 | 2/2004 |
| WO | WO 03/010766 | 2/2003 |

* cited by examiner

*Primary Examiner* — William C Vaughn, Jr.
*Assistant Examiner* — Eileen Adams
(74) *Attorney, Agent, or Firm* — Antonelli, Terry, Stout & Kraus, LLP.

(57) ABSTRACT

In a case of recording and managing a program which has a plurality of image streams in one program, it is necessary to address which stream a logic table which records a position of an I picture for high-speed fast forwarding and rewinding corresponds to.

In a recording method which records a digital broadcast, in particular one method is provided which records and manages the program which has the plurality of image streams in one program.

In the case in which there are a plurality of image streams in one program, as information which indicates which stream the logic table of the I picture, for carrying out the fast forwarding and rewinding operations quickly, corresponds to, a component tag fixed by a European or Japanese digital broadcast standard is recorded with the logic table. Also, in the event of recording an American broadcast stream, in digital broadcast standards of which there is no component tag regulation, a value of a program map table (PMT), which indicates one of the plurality of streams, is recorded.

6 Claims, 16 Drawing Sheets

DATA RECORDING METHOD

CLAIM OF PRIORITY

The present application claims priority from Japanese application serial no. JP2007-090210, filed on Mar. 30, 2007, the content of which is hereby incorporated by reference into this application.

BACKGROUND OF THE INVENTION

1. Field of the Invention

The present invention relates to a recording/reproducing device which records and reproduces data in and from a recording medium.

2. Description of the Related Art

As background technology of the technological field, there are, for example, JP-A-2000-152180 and JP-A-2001-101840.

In JP-A-2000-152180, in response to a problem stating: "to realize an image editing in a single recording medium, without overwriting an existing image recorded in the recording medium", it is described that means for resolution is used which states: "an optical disc has an AV file, in which are recorded a plurality of AV data, and an RTRW management file, in which are recorded a plurality of items of PGC information which specify a plurality of subintervals in the AV data. There being an original type and a user defined type of PGC information, each item of cell information in the user defined type of PGC information specifies one from among the subintervals in the AV data selected as editing material, and an alignment order thereof indicates a reproduction order provisionally decided by an image editing operation".

In JP-A-2001-101840, in response to a problem stating: "Moving images on a video tape cassette can only be viewed by mounting the cassette in a player, and reproducing. The viewing, in both a case in which all the moving images are viewed, and a case in which it is merely confirmed what kind of moving images are contained, necessitates carrying out exactly the same operation. Consequently, a considerable time is needed to find out in which video tape cassette a desired image is contained", it is described that means for resolution is used which states: "a still image, which is a representative, is generated for each unit of the moving images, only the still images are gathered and recorded, as management data separate from a moving image stream, in a medium in which the moving image stream is recorded, or in a medium, to which a quick access is possible, corresponding one to one to that medium. Then, by quickly reading the management data and displaying them, an outline of a whole of the moving image stream is swiftly presented to a user".

SUMMARY OF THE INVENTION

Along with a development of high efficiency coding technology, it has become possible to code amount compress digital data (hereafter referred to as an AV stream), including an image or sound, as digital data, and record them in real time in a high capacity recording medium, such as a hard disc or a recording optical disc. Also, with a recording/reproducing device which includes these recording media, in a case in which the digital data have been input from an exterior, by a broadcast or communication, in an already code amount compressed condition, it is also possible to record these digital data directly in the recording medium.

With these recording/reproducing devices, management information for managing the digital data to be recorded is generated, and they are recorded together on the same recording medium. In the event that a rewritable one is used as the recording medium, by rewriting the management information, and generating and operating a list which shows a reproduction order (hereafter called a playlist), a user can carry out an editing operation on the recording/reproducing device. That is, the playlist links together portions of the AV data, and indicates the reproduction order. As one example, a management condition of AV stream on a recording medium of the related art is shown in FIG. 2. 201, being the actual AV stream on the recording medium, shows a case in which a program no. 1 to a program no. 3 (for example, it corresponds to one program in a case in which a recorder which records broadcast programs has recorded one program) exist as recording units. 202 showing a second management hierarchy (a management level 2) of management information, original cell information no. 1 to original cell information no. 3 show all reproduction ranges of program units, the program no. 1 to the program no. 3, respectively. Also, user defined cell information no. 1 to user defined cell information no. 2, showing a reproduction range of a whole or a portion of a program freely specified by the user (for example, one portion which the user has specified of the one program in the heretofore described recorder), a quantity thereof increases or decreases in accordance with the user's editing operation. 203 showing a first management hierarchy (a management level 1) of the management information, and program set information including all the original cell information no. 1 to original cell information no. 3, by reproducing with this as a base, the user can reproduce all the AV stream recorded on the recording medium. Also, playlist information no. 1 to playlist information no. k showing a reproduction order of the user defined cell information freely specified by the user, it is possible to have a plurality thereof. Inside a frame indicated by 204 is original information which manages a whole of the AV stream in the management information, and inside a frame indicated by 205 is user defined information for managing playlists according to the user's editing operation.

In FIG. 2, as the playlist information is managed as the management level 1, in the same way as the program set information, an order of the plurality of items of playlist information themselves being uniquely determined, it has not been possible, for example, to carry out a change of a display order of a list of the playlists on a user interface. From a point of view of improving a usability, a kind of recording method and device with which the user can freely carry out a rearrangement operation of the playlist list display order on the user interface is desirable.

Also, in the heretofore known examples, no consideration has been given to a matter of a plurality of users generating, selecting and managing preferred playlist information.

Also, with regard to a resume reproduction in which a reproduction is done from a portion (a resume point) of the heretofore described JP-A-2000-152180, no consideration has been given to a point of being able to carry out a resume reproduction control in accordance with a reproduction condition, such as, for example, a case in which a playlist has been reproduced, or a case in which a program has been reproduced, at a time at which the reproduction is stopped.

Also, an optical disc being used as the recording medium, being intrinsically a medium with which the recording into the medium, a switching speed of the reproduction, and the like, are slow, regarding a case in which a reproducing process is carried out while recording, no consideration has been given to it as a recording format.

Also, in a case of a navigation display, which displays a list of program contents in the recording medium on one screen in reduced image (hereafter referred to as thumbnail) units, as a process is required which repeats an expansion of a compressed image of an actual program, a reduction to a thumbnail size, and a disposition on a navigation screen, when carrying out the display of the thumbnail, no consideration has been given to a point of carrying out the navigation display quickly.

Also, in the heretofore described JP-A-2001-101840, even in a case in which a plurality of program contents exist in the recording medium, a plurality of thumbnails corresponding one to each of the program contents have been recorded with one file (refer to FIG. 4, FIG. 7 etc. of JP-A-2001-101840). Specifically, in FIG. 4 of JP-A-2001-101840, it is a point in which a plurality of thumbnails 1 to 3 are recorded as one file ThumbNail.dat 70040. In this case, in order to, for example, delete one from among the plurality of thumbnails, it is necessary to open the ThumbNail.dat 70040 once and, after deleting an unnecessary thumbnail, save the ThumbNail.dat 70040. In the case in which there has been a kind of editing in which one portion of the ThumbNail.dat 70040 is deleted in this way, another thumbnail is relocated in such a way as to fill an empty area arising due to the deleted thumbnail, along with which all of the program contents are also relocated. That is, information on the other thumbnail, the program contents, and the like, is moved on the recording medium by an amount of a capacity of the deleted thumbnail. The larger a capacity of the recording medium, the more a processing time of this kind of information relocation accompanying the thumbnail deletion increases. In particular, it can be supposed that the increase in processing time is noticeable in a portable HDD or the like, of which a capacity increases from a current DVD (4.7 GB).

Also, in the heretofore described JP-A-2000-152180, as a method of recording, in a management file, an editing link point (hereafter referred to as an editing point), such as a reproduction starting point or a link point with another scene in a case in which the user freely specifies a reproduction position of a recorded image and sound stream, a method has been utilized which records with a presentation time stamp (PTS, MPEG (Moving Picture Expert Group) standard as data of the editing point. However, with this recording method, it is necessary to calculate how many GOP's from a PTS of the editing point it coincides with at a time of reproduction, and furthermore, to further calculate which frame of the GOP (hereafter, it will be taken that frame refers to a frame of an image signal) it coincides with, and control a stream to be supplied to an MPEG decoder, a display switch timing, and the like. In an actual control, it is preferable from an aspect of a control at the time of reproduction to manage which frame of which GOP (Groupe of Picture, MPEG standard) of the recorded image and sound stream is to be used.

Also, a point of making the reproducing device easy to control at the reproduction time, in accordance with incidental information on an AV stream peculiar to the digital broadcast, has not been considered in the heretofore described JP-A-2000-152180 and JP-A-2001-101840.

The invention, bearing in mind the heretofore described points, has an object of improving the usability of the recording/reproducing device.

An outline of one aspect of the invention is as follows.

In order to achieve the heretofore described object, a configuration is such as to add a management unit which manages all registered playlist information, and a higher management hierarchy, and handle the management unit in the same way as integrated information which shows a reproduction range of all AV stream. Also, the configuration being such as to handle the integrated information according to a user definition in the added management hierarchy, the configuration is such as to be able to register an optional reproduction range included in a lower hierarchy in the integrated information.

Also, in order to interrupt a reproduction of a reproduced program partway through, and carry out the reproduction again from a reproduction stopping point, a position in which the reproduction has been stopped is recorded as management information in the recording medium, and by independently holding a resume point at a playlist reproduction time, a resume point at a program reproduction time, a resume point according to an operating condition of the reproducing device, and the like, a resume reproduction control is carried out in accordance with a reproduction condition at a reproduction stopping time.

Also, in order to arrange in such a way that the recording medium, using a high speed hard disc drive, can carry out an operation such as the reproduction while recording, a recording/reproducing unit is configured in such a way as to secure a prescribed amount of units which record or reproduce a program stream.

Also, in order to accelerate a navigation display, a configuration is such that a navigation display thumbnail generated in advance is recorded on the recording medium, correlated to the program.

Also, as management information of the editing point, which frame (a frame number) of which GOP (a GOP number) of the recorded image and sound stream it is recorded.

Also, a configuration is such as to record the incidental information in the AV stream peculiar to the digital broadcast in the management file.

In the invention, in order to achieve the heretofore described object, a configuration described in the claims is used as one example.

BRIEF DESCRIPTION OF THE DRAWINGS

These and other features, objects and advantages of the present invention will become more apparent from the following description when taken in conjunction with the accompanying drawings wherein:

FIG. 8 is a diagram showing one example of a file structure of each of the original integrated information, playlist integrated information, the user defined integrated information, playlist information, program information, AV stream (program), and the like;

DETAILED DESCRIPTION OF THE PREFERRED EMBODIMENTS

Hereafter, a description will be given, using the drawings, of an embodiment of the invention.

Figure 1:
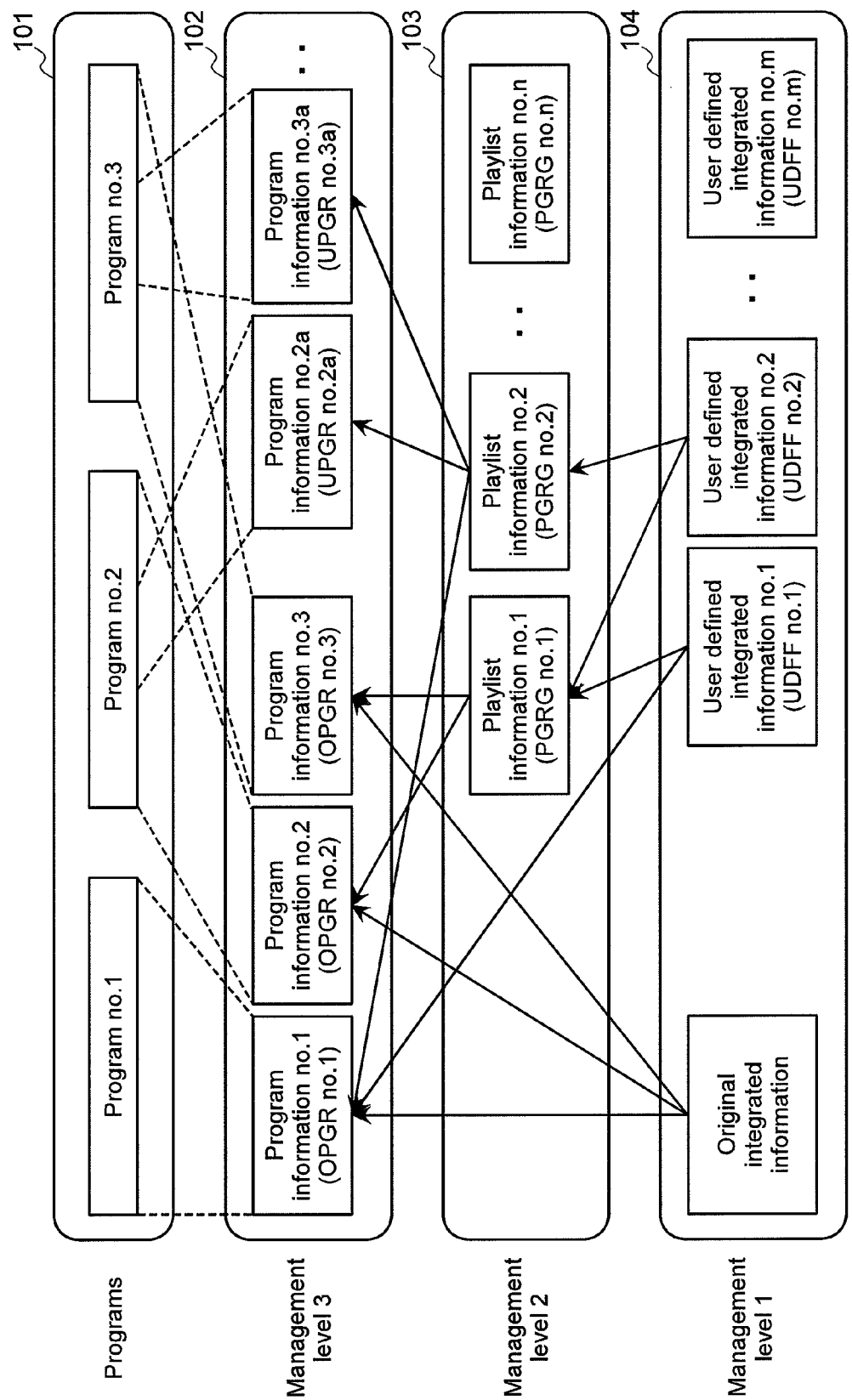
FIG. 1 is a diagram showing a management condition of AV data by a recording/reproducing device according to the invention.
Figure 2:
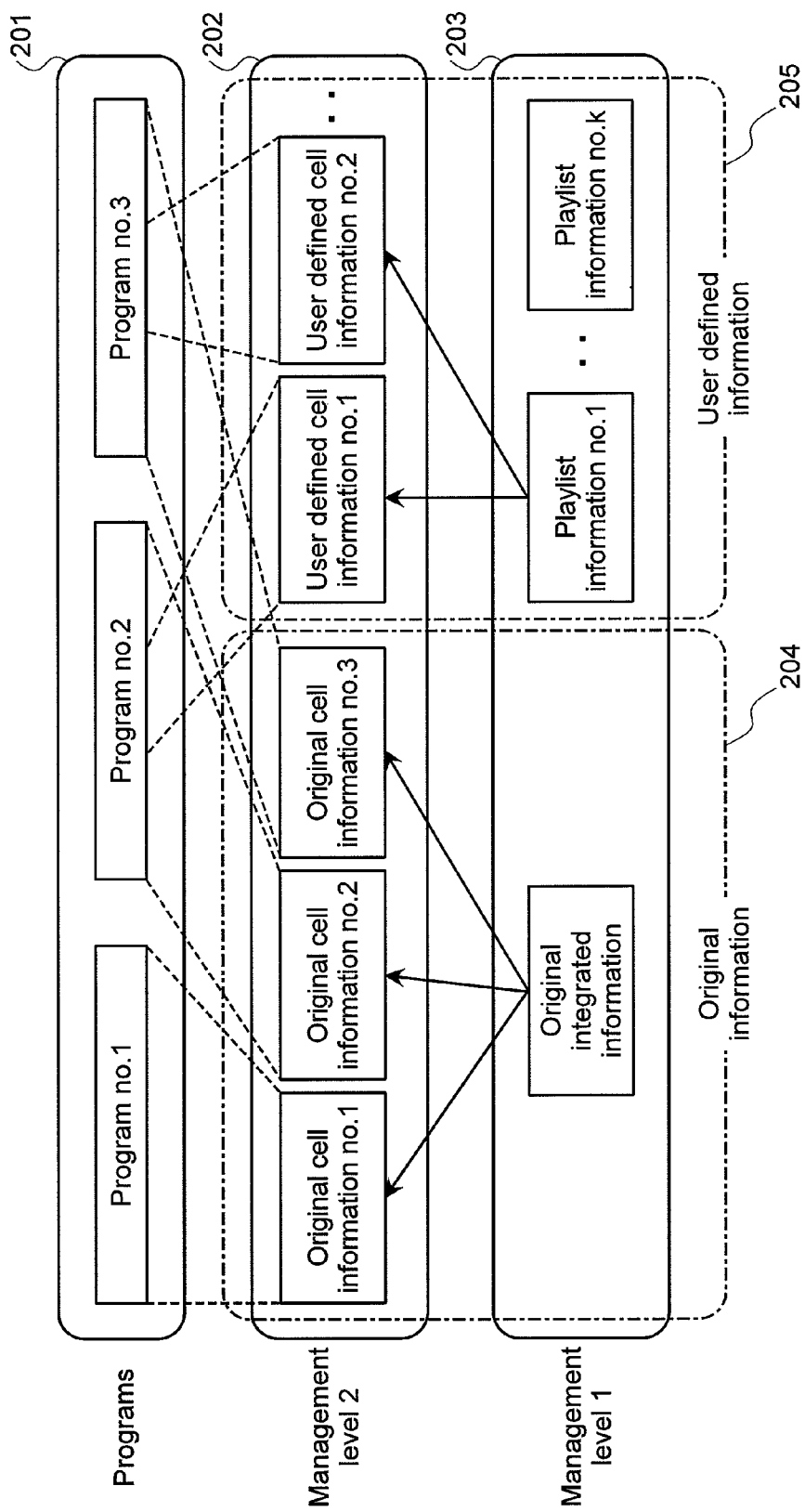
FIG. 2 is a diagram showing a management condition of AV data according to the heretofore known example.

FIG. 1 shows a management condition of AV stream on a recording medium, in a recording/reproducing device according to the embodiment. 101, in the same way as 201 in FIG. 2, being actual AV stream on a recording medium, shows a case in which a program no. 1 to a program no. 3 exist as recording units.

102, corresponding to 202 in FIG. 2, shows here a third management hierarchy (management level 3) of management information. Program information no. 1 to program information no. 3 show all reproduction ranges of program units, the program no. 1 to the program no. 3, respectively (hereafter, program information forming a pair with an entity of these programs, will be referred to as "original program information". Also, it is shown as "OPGR no. 1" in FIG. 1). Also, program information no. 2a to program information no. 3a, showing a reproduction range of a whole or a portion of a program freely specified by a user (hereafter, these will be referred to as "user defined program information". Also, they are shown as "UPGR no. 2a" in FIG. 1.), show here a portion of the program no. 2 and a portion of the program no. 3 respectively. Information of places corresponding to the program information no. 1 to program information no. 3 also increases or decreases along with an addition or deletion of the AV stream, that is, an increase or decrease of the program. Also, a quantity of information of places corresponding to the program information no. 2a and program information no. 3a increases or decreases in accordance with an editing operation by the user.

Although 103 corresponds to the management level 1 in FIG. 2, it shows here a second management hierarchy (a management level 2) of the management information, and it includes only playlist information no. 1 to playlist information no. n. Each item of playlist information showing a reproduction order of optional program information in the management level 3, it is possible to have a plurality thereof.

104, as a characteristic point of the embodiment, being a first hierarchy (a management level 1) of newly added management information, includes a plurality of items of integrated information. Original integrated information being integrated information which stores system resume information and the like, details will be described hereafter. User defined integrated information no. 1 to user defined integrated information no. m includes an optional one or plurality of items from among the playlist information in the management level 2 and the program information in the management level 3. For example, in a case in which a plurality of users use a single recording medium, by using one item of user defined integrated information per user, it is possible to manage reproduction contents which match preference of each user.

Next, a more specific description of the embodiment of the recording/reproducing device according to the invention will be given, using different drawings.

Figure 3:
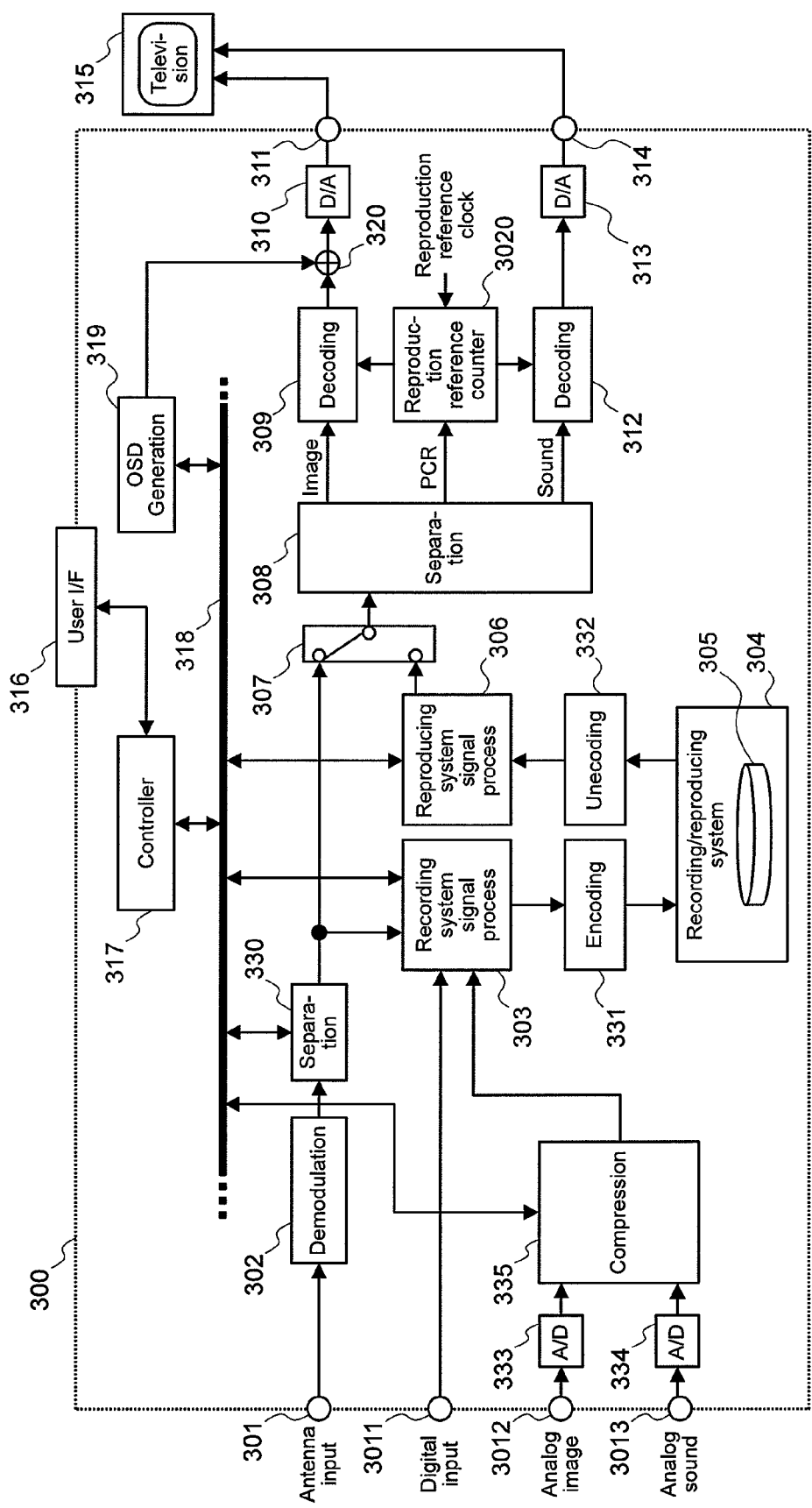
FIG. 3 is a block diagram of the recording/reproducing device according to the invention.

FIG. 3 being a block diagram of showing an example of the recording/reproducing device according to the embodiment, it shows a kind of recording/reproducing device which can receive a digital broadcast and record it on the recording medium, as well as reproducing the recorded data, and obtaining a reproduction transmission. 300 is the recording/reproducing device, 301 an input terminal which inputs a receiving wave from an antenna, 3011 an input terminal for inputting compressed image and sound data from another instrument, 3012 an analog image input terminal for inputting an analog image signal, 3013 an analog sound input terminal for inputting an analog sound signal, 333 and 334 analog/digital (A/D) converter circuits for converting an analog signal into a digital signal, 302 a demodulating circuit, 330 a separation circuit which separates a demodulated digital signal into sound, image and other data, 335 a compression circuit which compresses digitalized image and sound signals, 303 a recording system signal processing circuit, 331 an encoding circuit for encoding data to be recorded, 304 a recording/reproducing system including a drive function of the recording medium, 305 the recording medium, 332 an unencoding a circuit for unencoding encoded data recorded on the recording medium, 306 a reproducing system signal processing circuit, 307 a switching circuit, 308 a separation circuit, 309 an image decoding circuit, 310 a digital/analog (D/A) converter circuit, 311 an image output terminal, 312 a sound decoding circuit, 3020 a reproduction reference counter, 313 a D/A converter circuit, 314 a sound output terminal, 315 a television set, 316 a user I/F, 317 a controller, 318 a system bus, 319 an OSD generator, and 320 an adding circuit.

At a time of recording, a signal transmitted from a broadcasting station by means of a digital broadcast or the like, and received by the recording/reproducing device, after being demodulated by a prescribed method in the demodulating circuit 302, is subjected to necessary signal processes, such as an addition of data for a timing adjustment and a modulation, in the recording system signal process circuit 303, and is recorded on the recording medium 305 by the recording/reproducing system 304, after being encoded by the encoding circuit 331. Also, a digital signal input from the digital input terminal 3011 is subjected to the necessary signal processes, such as the addition of the data for the timing adjustment and the modulation, in the recording system signal process circuit 303, and is recorded on the recording medium 305 by the recording/reproducing system 304, after being encoded by the encoding circuit 331. Also, an analog image signal input from the analog image input terminal 3012, and an analog sound signal input from the analog sound input terminal 3013, are subjected to a compression process by the compression circuit 335, and are recorded on the recording medium 305 by the recording/reproducing system 304, via the recording system signal process circuit 303, after being encoded by the encoding circuit 331.

At a time of reproduction, encoded digital data read via the recording/reproducing system 304 from the recording medium 305, in accordance with an instruction from the user, are unencoded by the unencoding circuit 332, are subjected to signal processes necessary for the reproduction, such as a demodulation by a format in keeping with a prescribed modulation method, in the reproduction system signal processing circuit 306, and are transmitted to the separation circuit 308 via the switching circuit 307. The separation circuit 308, based on a PID (Packet IDentifier, MPEG standard) in the AV stream, to be described hereafter, sorts the AV stream into the image decoding circuit 309, or the sound decoding circuit 312, or the reproduction reference counter 3020. At a point at which the reproduction is started, a first PCR (Program Clock Reference, MPEG standard) value is set in the reproduction reference counter 3020, from which point the reproduction reference counter 3020 counts up with a reproduction reference clock used in a decoding. The digital data are subjected to a prescribed image decoding process by the image decoding circuit 309 and, after a conversion from the digital data to an analog signal has been done in the D/A converter circuit 310, at a time at which a value of the reproduction reference counter 3020 has matched a value of a display time included in an AV stream of a decoded image signal, an image is displayed on a monitor output of the television set 315 via the image output terminal 311. Also, the digital data are subjected to a prescribed sound decoding process by the sound decoding circuit 312 and, at a time at which the value of the reproduction reference counter 3020 has matched a value of a display time included in an AV stream of a decoded sound signal, after a conversion from the digital data to an analog signal has been done in the D/A converter circuit 313, a sound is transmitted by a sound transmission mechanism of the television set 315 via the sound output terminal 314, so a synchronization of the image and sound is maintained, and they are reproduced by the television set 315.

The controller 317 controls each part of the recording/reproducing device 300 via the system bus 318, as well as controlling a whole of the device in such a way as to carry out operations based on a user's instruction input, input via the user I/F 316. An instruction input request to the user, or a necessary OSD display to the user, being prepared in the OSD generator 319, is added to the output of the image decoding circuit 309 at an appropriate level in the adding circuit 320, and realized by ultimately being transmitted to a monitor screen of the television set 315.

Next, a description will be given, as a specific example of use of a management information configuration in FIG. 1, of a case in which each item of integrated information in the management level 1 is used in a menu display of the recorded data.

Figure 4:
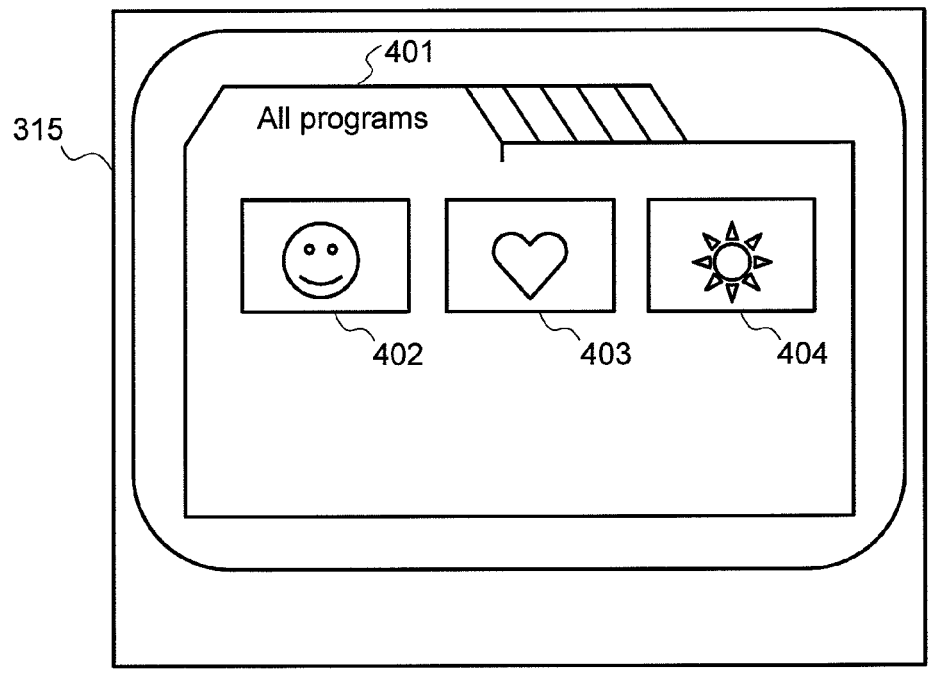
FIG. 4 is a display output example of original integrated information.

FIG. 4 is one example of carrying out a menu display using the original integrated information in FIG. 1. 315 is the television set in FIG. 3, 401 a tag for displaying all programs, 402 thumbnail showing program information no. 1, 403 thumbnail showing program information no. 2, and 404 thumbnail showing program information no. 3. The user, by determining a selection by moving a cursor position on the screen to a desired thumbnail, by means of a remote control or the like, can reproduce an optional program or all the programs.

Figure 5:
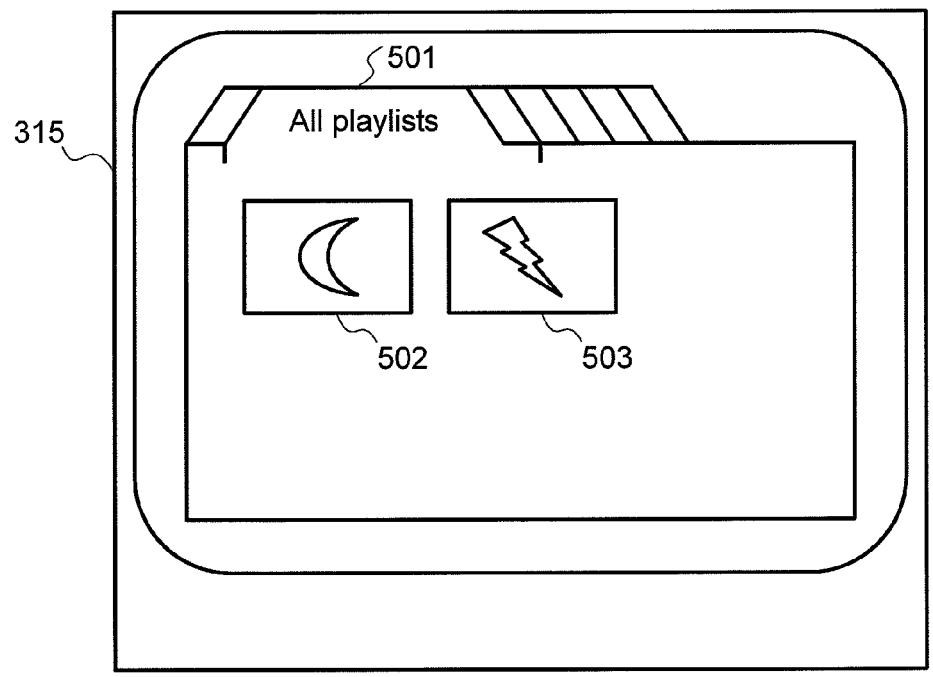
FIG. 5 is a display output example as a list of playlists of user defined integrated information.

Next, FIG. 5 is one example of using one of a certain number of items of the user defined integrated information in FIG. 1, and carrying out a menu display with this as a playlist. 501 is a tag for displaying all playlists, 502 thumbnail showing playlist information no. 1, and 503 thumbnail showing playlist information no. 2. The user, by determining a selection by moving a cursor position on the screen to a desired thumbnail, by means of a remote control or the like, in the same way as in the previously described case, can reproduce an optional playlist or all the playlists. A switching of a display from the all program display tag 401 to the all playlist display tag 501 can be realized, for example, by the user moving the cursor at a tag character position, or the like.

Figure 6:
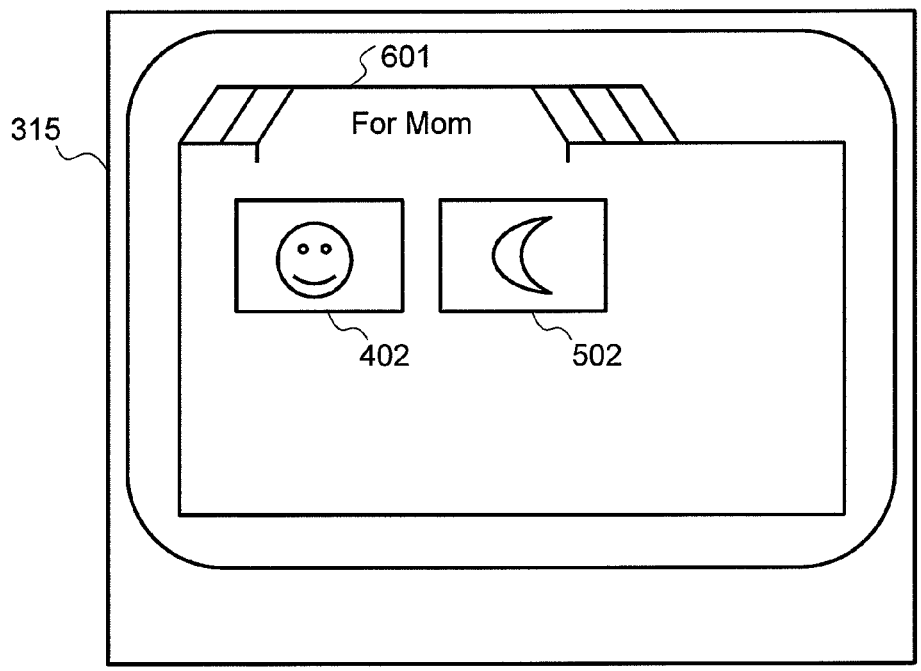
FIG. 6 is a first display output example of the user defined integrated information.

Next, FIG. 6 is one example of carrying out a menu display using the user defined integrated information no. 1 in FIG. 1. 601 being a tag for a user no. 1 (taken here to be "Mom") menu display, 402 and 502, as is clear from FIG. 1, are thumbnails showing the program information no. 1 and the playlist information no. 1. "Mom" having the Mom menu display tag 601 as her own exclusive folder, it is possible to freely register and delete data she wishes to reproduce.

Figure 7:
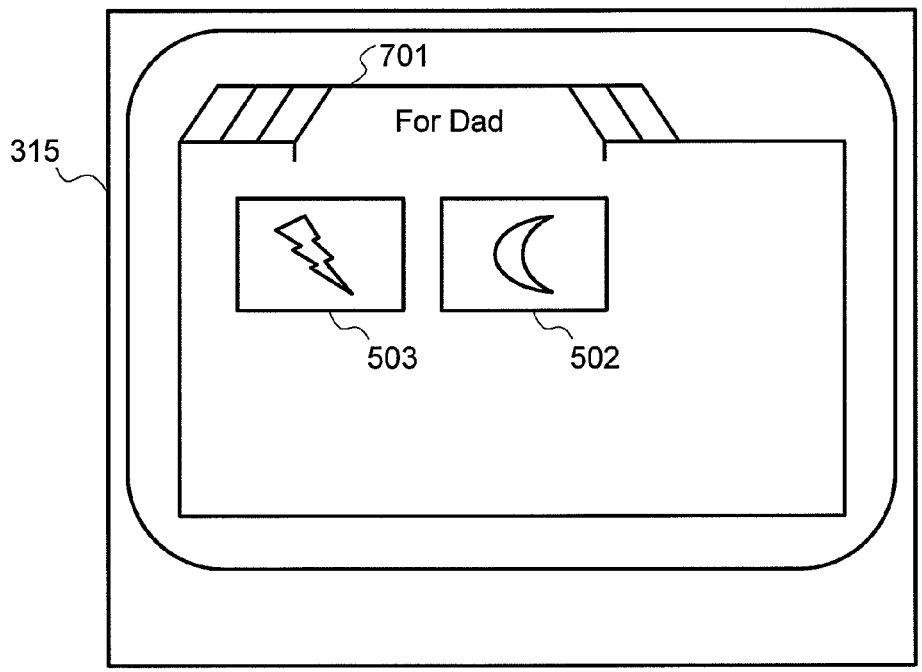
FIG. 7 is a second display output example of the user defined integrated information.

In the same way, FIG. 7 is one example of carrying out a menu display using the user defined integrated information no. 2 in FIG. 1. 701 being a tag for a user no. 2 (taken here to be "Dad") menu display, 503 and 502, as is clear from FIG. 1, are thumbnails showing the playlist information no. 2 and the playlist information no. 1. In this case, although "Dad" has selected two playlists, it is possible to change a reproduction order thereof. Also, in the same way as the previously described "Mom", "Dad" having the Dad menu display tag 701 as his own exclusive folder, it is possible to freely register and delete data he wishes to reproduce.

In the heretofore described way, according to the embodiment of the invention, a configuration is such as to add a management unit which manages all of the registered playlist information, and a higher management hierarchy, and handle them in the same way as the integrated information which shows a reproduction range of all the AV stream. Also, the configuration being such as to handle the integrated information according to a user definition in the added management hierarchy, the configuration is such as to be able to register an optional reproduction range included in a lower hierarchy in the integrated information according to the user definition. By this means, the user can select and manage an optional playlist or a reproduction range.

By arranging in this way, even in a case in which a plurality of users share a single recording medium, or the like, it being possible for each user to manage preferred reproduction contents, a usability improves.

Although, in the heretofore described embodiment, the case has been described in which the digital broadcast is received, and the digital data are recorded as they are, not being limited to this, it is also acceptable to have a kind of configuration which provides a network I/F and acquires the AV stream from an external network, or provides a coding device which records the analog data in the recording medium while coding them. That is, the embodiment referring to the data management on the recording medium, it is not especially limited with regard to an input path.

Figure 8:
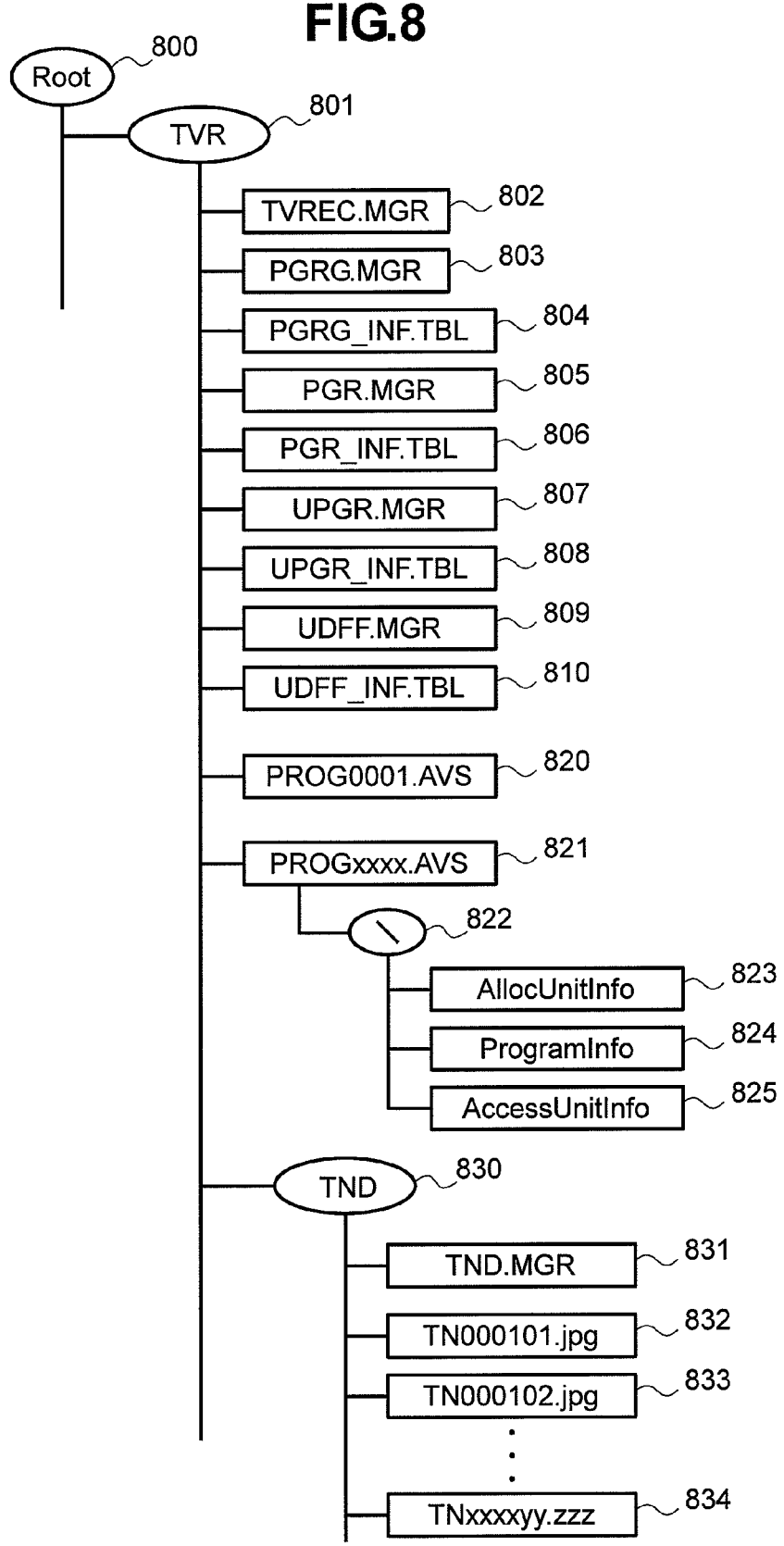

FIG. 8 shows one example of in what kind of file configuration the heretofore described program and program information, playlist information, and original integrated information and user defined integrated information are actually recorded on the recording medium 305 (FIG. 3). The recording medium being a medium which carries out a digital recording and reproduction, each file on the medium is managed with a filing system similar to that used in a management of a recording medium such as a so-called personal computer. In the same figure, ROOT 800 shows a highest hierarchy of a file directory, and TVR 801, being a directory in a lower hierarchy thereof, shows each file configuration which realizes the management configuration shown in FIG. 1 according to the invention. Management files such as TVREC. MGR 802, PGRG.MGR 803, PGRG_INF.TBL 804, PGR.MGR 805, PGR_INF.TBL 806, UPGR.MGR 807, UPGR_INF.TBL 808, UDFF.MGR 809, and UDFF_INF.TBL 810, and AV stream PROG0001.AVS 820, . . . PROGxxxx.AVS (a number is attached in a xxxx portion of an AV stream file, for example, an order number increases every time an AV stream is recorded) 821, in which the image and sound are multiplexed, are recorded below the TVR 801. 830 being a directory further below the TVR 801, it is a directory with a directory name TND for storing thumbnail-related files used in a navigation list or the like recorded in the recording medium. 831 is a thumbnail management file which integratedly manages actual files 832, 833, . . . 834 of a thumbnail with a file name TND.MGR. A file name of the actual files of the thumbnail, as shown in 834, is taken as TNxxxxyy.zzz, where xxxx corresponds to xxxx of a program file 821 relating to the thumbnail, a number of an order in which it has been registered as the thumbnail is allotted to yy, and a zzz portion, for example, is bmp in the event that a kind of thumbnail data is an uncompressed bit map, and jpg in the event that it is a JPEG (Joint Photographic Experts Group) compressed kind. In the embodiment, thumbnail files corresponding to each program file are recorded separately, as with 832 to 834. In this way, by separately recording a plurality of thumbnail files, as with 832 to 834, without gathering them into one file, a process when adding or deleting a thumbnail file becomes easier. Particularly in a large capacity recording medium such as a portable hard disc, it is possible to achieve a reduction in a processing time when adding or deleting the thumbnail file.

Figure 14:
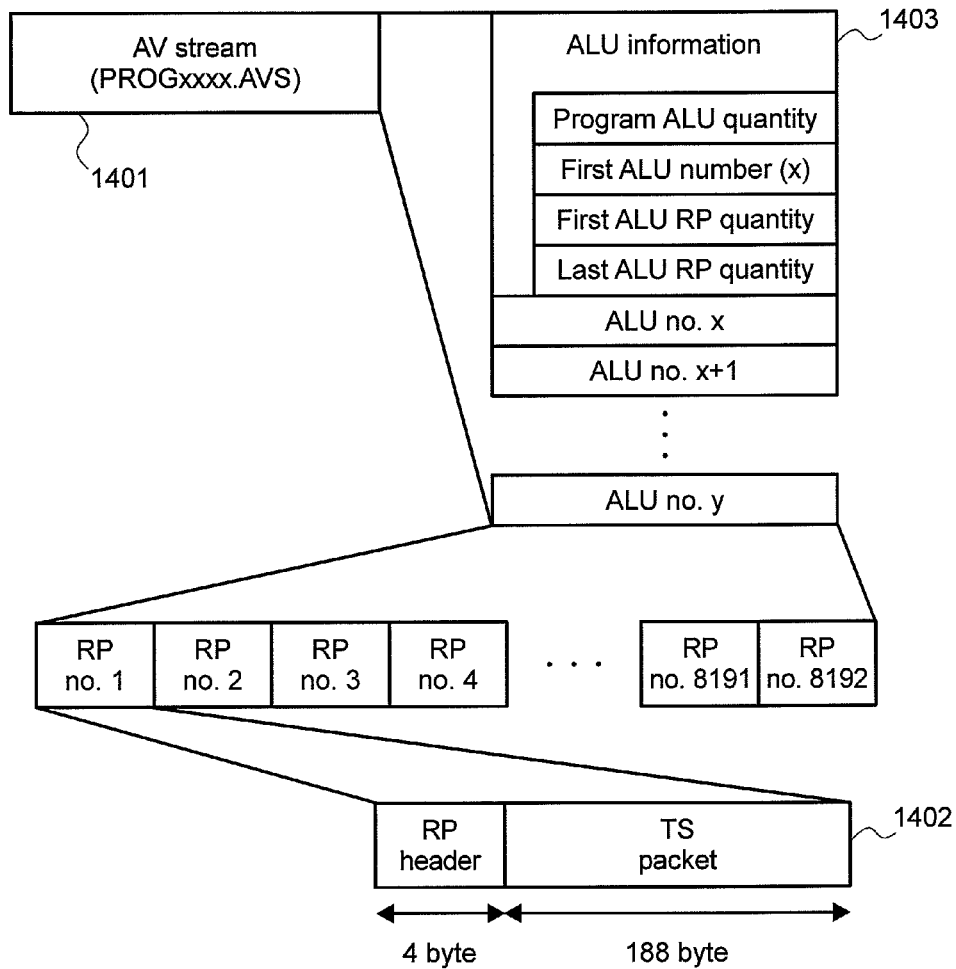
FIG. 14 shows a packet configuration of an AV stream file.

The AV stream files 820 (PROG0001.AVS) and 821 (PROGxxxx.AVS) of FIG. 8 are recorded by a configuration shown in FIG. 14.

1401 in FIG. 14 being an AV stream file, a minimum unit when recording an AV stream received by a broadcast is taken to be an ALU. Also, in the event that the AV stream has been encoded, the ALU is also a minimum unit of the encoding. An RP 1402, which is a unit of a recording packet, is a 192 byte data packet to which a time stamp at a time of receiving (counting at 27 MHz, a count value of 4 bytes at a point of receiving) is added as a header to an MPEG (Moving Picture Expert Group) standard transport packet (188 bytes) and, in the embodiment, 8,192 of these 192 byte RP packets 1402 are gathered as one ALU. An ALU no. 1 to ALU no. v (8,192 RP's each) and, in addition to the sequentially recorded AV streams, a total ALU quantity of recorded AV streams, as ALU information 1403, as well as a first ALU number, a first ALU RP quantity, and an AV stream final ALU RP quantity, are recorded in the AV stream file 1401. The ALU information 1403 corresponds to an AllocUnitInfo 823 in FIG. 8. This, because there is a case in which the first ALU and the final ALU RP quantity of the AV stream do not reach 8,192, is for recording them (details will be described hereafter).

Also, the AV stream files 820 and 821 have a configuration of a stream directory 822 in a lower hierarchy of a file structure, regulated by, for example, a UDF (Universal Disc Format), and furthermore have files called AllocUnitInfo 823, ProgramInfo 824, and AccessUnitInfo 825, called named streams.

Figure 9:
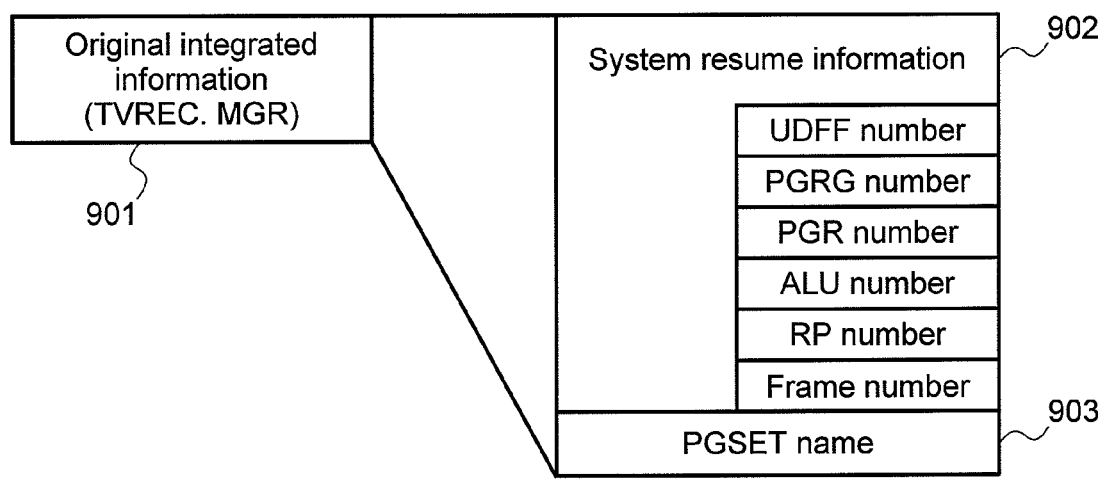
FIG. 9 shows one example of a management table structure of each item of the original integrated information.

FIG. 9 shows a management table configuration of the TVREC.MGR 802 (FIG. 8). System resume information 902 and a program integrated information name 903 are recorded as original integrated information 901.

As the system resume information, a number of user defined integrated information (UDFF), and a playlist information (PGRG) number of a hierarchy immediately below, at a point at which the user stops the reproduction, a number (PGR) of original program information (OPGR) or user defined program information (UPGR) of a hierarchy immediately below, an ALU number which is a minimum unit at a time of recording the AV stream, to be described hereafter, corresponding to a GOP at the point of stopping, an RP number of a recording packet of a corresponding GOP inside the ALU, and a frame number of the corresponding GOP are recorded as a table. By so doing, it is possible to carry out a control of a system resume reproduction start at an accuracy of a frame unit. In order to judge whether the PGR number is OPGR or UPGR, it is differentiated, for example, as OPGR in the event that the PGR number (hexadecimal) is 0000 to 7FFF, and UPGR in the event that the PGR number (hexadecimal) is 8000 to FFFF. 903 being a field in which a name (PGSET name) given to program integrated information is recorded, for example, character string information on a name which the user has bestowed on a collection of contents recorded in the recording medium is recorded. By so doing, as it is possible to use it in a discrimination of who is using the recording medium, or the like, and it is possible to record a name relating to the collection of contents, there is an advantage in that it becomes easier to ascertain recorded contents.

Figure 10:
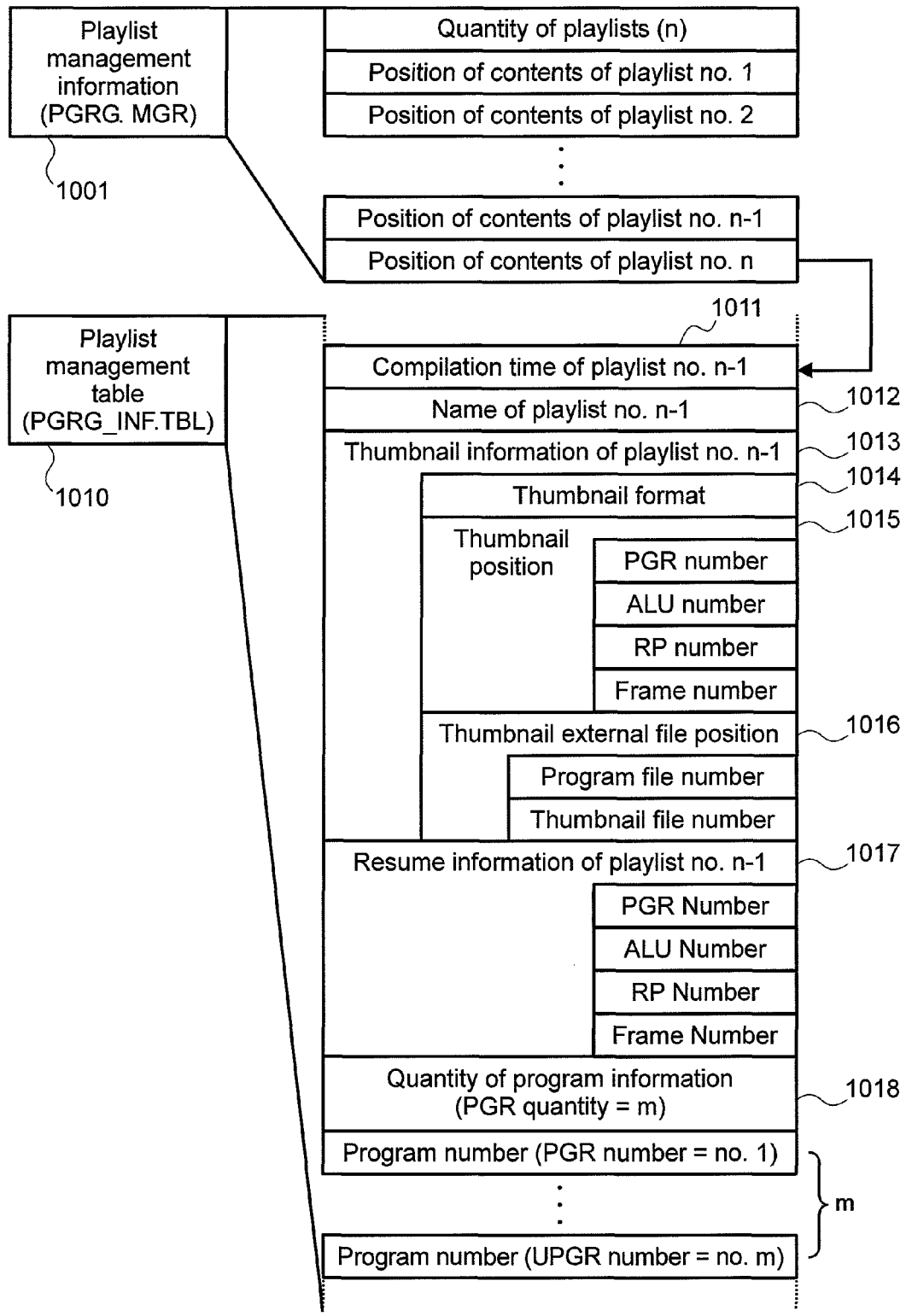
FIG. 10 shows one example of a configuration of playlist management information and management table configuration.

FIG. 10 shows contents of a playlist management information (PGRG) file 1001, and a playlist management table file 1010, which manage the playlist. The playlist management information (PGRG) file corresponds to the PGRG.MGR 803 of FIG. 8, and the playlist management table file 1010 to the PGRG_INF.TBL 804 of FIG. 8. A quantity of playlists which the user has registered by editing (a case of n in FIG. 10), and information on positions in the playlist management table file PGRG_INF.TBL (for example, information on how many bytes from a head of the playlist management table file PGRG_INF.TBL 1010) in which are recorded contents of a following playlist no. 1, playlist no. 2 . . . playlist no. n−1, and playlist no. n, are recorded in the PGRG.MGR 1001.

The following information on each of the playlists no. 1, . . . , no. n−1, and no. n is recorded as a table in the playlist management table file 1010. A configuration of the playlist no. n−1 is shown as a detailed example of the playlist management table 1010 of FIG. 10. A compilation time 1011 (a time at a point at which the user, operating the device, has compiled the playlist no. n−1), as well as a name 1012, thumbnail information 1013, resume information 1017 and, following this, a quantity of program information 1018 showing original program information (OPGR) or user defined program information (UPGR) registered in the playlist no. n−1, and a number of the registered number list program information (PGR information. The differentiation between the OPGR and the UPGR is, as previously described, that a PGR number (hexadecimal) of 7FFF or less is OPGR, while one of 8000 or more is UPGR), are recorded as the information of the playlist no. n−1.

As the playlist compilation time 1011 is recorded as the management information, it is possible, at the time of reproduction, to display a playlist list in a compilation time order.

The thumbnail information 1013 of FIG. 10 is configured of format information (information on whether contents protection is necessary or unnecessary, whether or not it is necessary to compile a thumbnail to be displayed based on a reference position of a recorded AV stream image, whether to refer to thumbnail data registered in an external file, and the like) 1014, position information 1015 displayed as a thumbnail in the AV stream, and external file thumbnail data position information 1016. The thumbnail position information 1015 is configured of a program information (PGR) number displayed as a thumbnail, a number of an ALU corresponding to a GOP position of a thumbnail displayed by an AV stream corresponding to the PGR number, an RP number in the ALU number corresponding to the GOP, and a frame number to be displayed as a thumbnail of the GOP.

A number (OPGR in the event that the PGR number is 7FFF or less, UPGR in the event that it is 8000 or more) of a program (PGR) being reproduced at a point at which the reproduction of playlist no. n−1 is stopped, an ALU number corresponding to a GOP in the PGR number at the point at which the reproduction is stopped, an RP number, and a frame number in the GOP at the time of stopping, are recorded in the resume information 1017. By so doing, the resume, in addition to the system resume information 902 shown in FIG. 9, can individually record and manage resume information for each individual item of original program information or user defined playlist, as with the resume information 1017. Therefore, as a resume reproduction function at the time of reproduction, it is possible to provide a function capable of a resume reproduction control including, for example, carrying out a reproduction control at a resume point of each original program and, in accordance with a previous reproduction stopping condition, indicating at what number of the user defined integrated information (UDFF) the reproduction has been stopped, and the like, and it is possible to carry out the control of the reproduction start at the accuracy of the frame unit.

Figure 11:
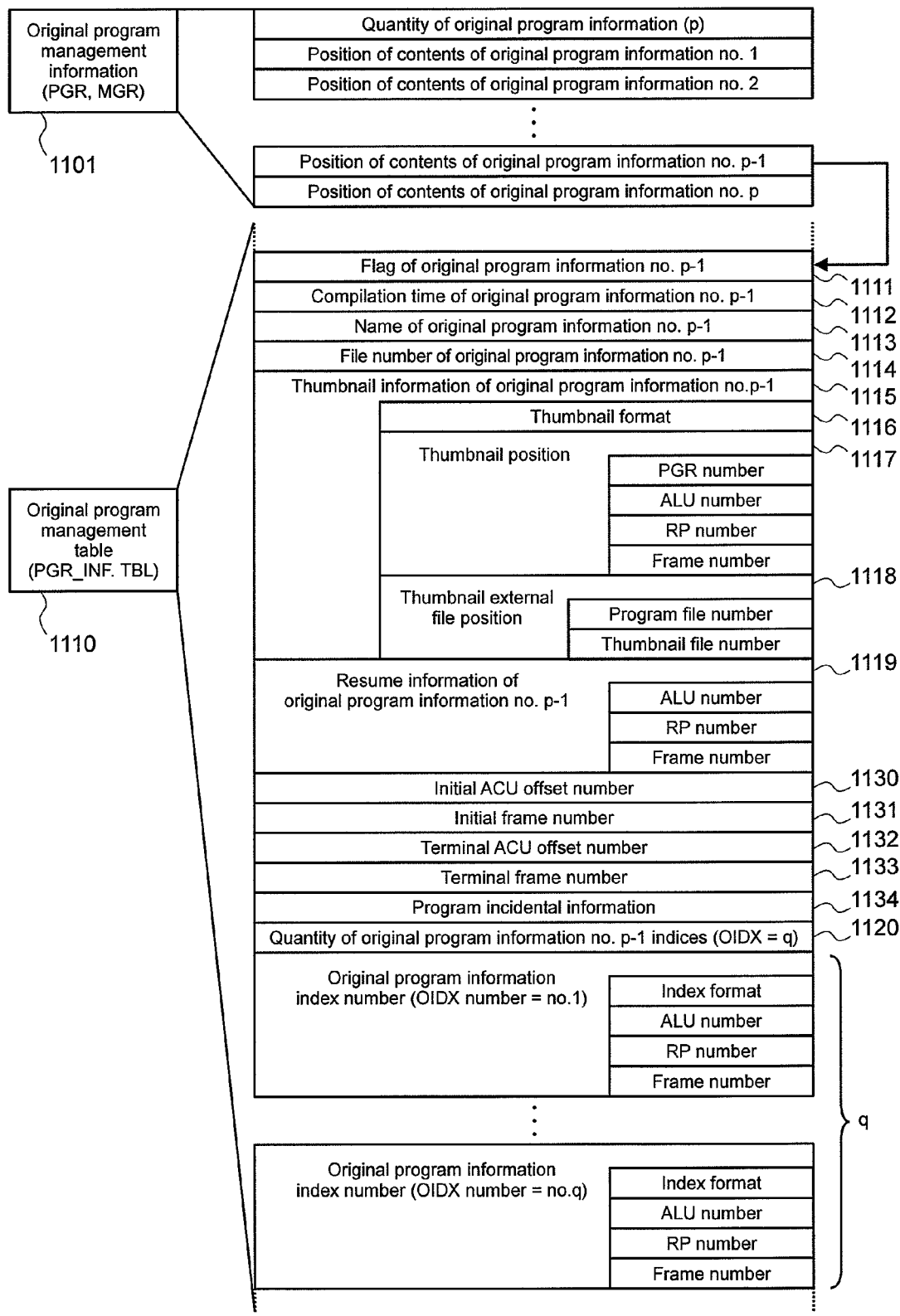
FIG. 11 shows one example of a configuration and management table of original program management information.

FIG. 11 shows contents of an original program management information (OPGR) file 1101 and an original program management table file 1110. Including all the original program information on the recording medium, by reproducing with this as a base, the user can reproduce all the AV data recorded on the recording medium. The original program management information (OPGR) file 1101 corresponds to the PGR.MGR 805 of FIG. 8, and the original program management table file 1110 to the PGR_INF.TBL 806 of FIG. 8. A quantity of original programs recorded in the recording medium (a case of p in FIG. 11), and information on positions in the original program management table file 1110 (for example, information on how many bytes from a head of the original program information management table file PGR_INF.TBL 1110) in which are recorded contents of following original program information no. 1, original program information no. 2. original program information no. n−1, and original program information no. n, are recorded in the original program management information file 1101.

A table portion of the playlist no. p−1 is shown as a detailed example of the original program management table 1110 of FIG. 11. A program information flag 1111, including whether the no. p−1 original program information is valid or invalid, copy control information (hereafter referred to as CCI), and the like, a compilation time 1112 (a time at a point at which the user, carrying out a recording operation with the device, has compiled the original program information no. p−1), as well as a name 1113, a thumbnail file number (the xxxx of PROGxxxx.AVS 821 appearing in FIG. 8) 1114, thumbnail information 1115, resume information 1119 and, furthermore, an index quantity 1120, an ALU number and RP number corresponding to a GOP of an AV stream corresponding to the program information no. p−1, which shows a format, and a position of an index, for each individual index number, and a frame number specified as an index in the GOP, are disposed as the information of the playlist no. p−1. The index being, for example, specified position information in a case in which the user edits a program corresponding to the original program information no. p−1, and specifies a marking point specification, as long as the index has been specified by the editing, an operation such as causing the program corresponding to the original program information no. p−1, at the time of reproduction, to leap swiftly to the position specified by the index, is possible in the frame unit. Each component of the thumbnail information 1115; a thumbnail format 1116, a thumbnail position 1117, and a thumbnail external file position 1118, have the same kind of data structure as the thumbnail format 1014, the thumbnail position 1015, and the thumbnail external file position 1016 in the previous playlist management table 1010 of FIG. 10. Also, configuration components of the resume information 1119 are also similar to the previous resume information 1017 of FIG. 10.

Also, a difference value between an initial GOP position of an AV stream of a recorded original program, and a GOP corresponding to an initial reproduction position, is recorded in an initial ACU offset number 1130 of FIG. 11, while a frame number of the GOP wished to be reproduced is recorded in an initial frame number 1131. A definition of an ACU entry number will be given hereafter. Also, a difference value between a terminal GOP of the AV stream of the recorded original program, and an ACU entry number corresponding to a terminal GOP to be reproduced, is recorded in a terminal ACU offset number 1132, while a frame number to be reproduced in the terminal GOP to be reproduced is recorded in a terminal frame number 1133. By so doing, it is possible to prevent a reproduction of an unnecessary previous or subsequent portion, from among the recorded streams, from being done. Also, by regulating a size of a difference value between a head of the AV stream of the actual recorded original program and a reproduction start, and furthermore, by regulating a difference value between a terminus of the AV stream of the actual recorded original program and a reproduction terminus, it is possible to limit a time gap between the AV stream of the actually recorded original program and the AV stream of the original program to be reproduced to within a regulation size. Therefore, in the event that, for example, data of this reproduction range are destroyed for some reason, although, in a worst case, there is a possibility of a condition occurring in which the reproduction is absolutely impossible, by keeping within the regulation size, it is possible to reduce a range in which the reproduction is impossible. However, it is also acceptable that the initial ACU offset number 1130 and the terminal ACU offset number 1132 are absolute values (not a difference value) of an ACU entry number which specifies the range to be reproduced.

Also, incidental information in the recorded AV stream is recorded in program incidental information 1134 of FIG. 11.

Figure 20:
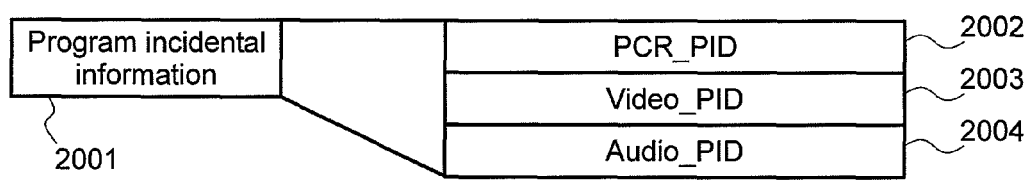
FIG. 20 shows a configuration of program incidental information to be recorded.

In FIG. 20, program incidental information 2001 corresponding to 1134 of FIG. 11, a PID value when including a PCR value, which is a reference time when transmitting in a first AV stream at a time of starting the recording, is recorded in a PCR_PID 2002 (PCR: Program Clock Reference, PID: Packet IDe-ntifier, both MPEG standard).

Also, in the same figure, a PID value when including an elementary stream of an image (hereafter ES: MPEG standard) is recorded in a Video_PID 2003.

Also, in the same figure, a PID value when including an ES of a sound is recorded in an Audio_PID 2004. At the reproduction time, depending on the values of the heretofore described PCR_PID 2002, Video_PID 2003 and Audio_PID 2004, a process is carried out which sorts a TS packet into the various decoding circuits (the image decoding circuit 309 and sound decoding circuit 312 in FIG. 3, and the reproduction reference counter 3020) (the separation circuit 308 of FIG. 3).

Figure 12:
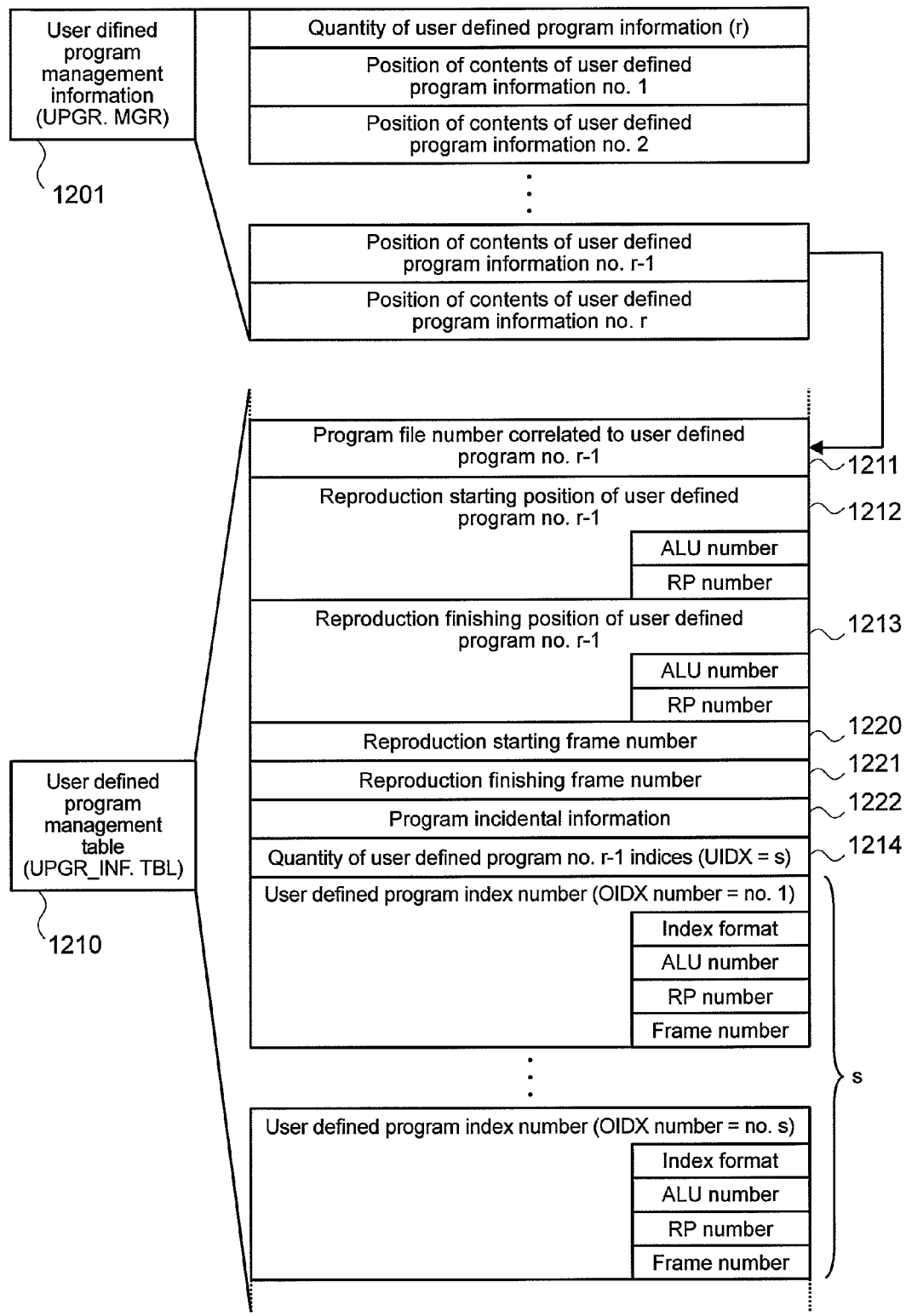
FIG. 12 shows one example of a configuration and management table of user defined program information.

FIG. 12 shows contents of a user defined program management information (UPGR) file 1201 and a user defined program management table file 1210. The user defined program management information (UPGR) file 1101 corresponds to the UPGR.MGR 807 of FIG. 8, and the user defined program management table file 1210 to the UPGR_INF.TBL 808 of FIG. 8. A quantity of user defined programs which the user has registered by editing (a case of r in FIG. 12), and information on positions in the user defined program management table file 1210 (for example, information on how many bytes from a head of the user defined program management table file (UPGR_INF.TBL) 1210) in which are recorded contents of following user defined program information no. 1, user defined program information no. 2 ... user defined program information no. r−1, and user defined program information no. r, are recorded in the user defined program management information file 1201.

A table portion of the user defined program no. r−1 is shown as a detailed example of the user defined program management table 1210 of FIG. 12. A program file number (the xxxx of PROGxxxx.AVS 821 appearing in FIG. 8) 1211 relating to the user defined information, a reproduction start position (as information, an ALU number corresponding to an initial GOP which specifies the reproduction in the AV stream, an RP number, and a frame number 1220 which starts the reproduction in the GOP) 1212 of the AV stream of the heretofore mentioned file number, specified as the user defined program information, as well as a reproduction finishing position 1213 (as information, an ALU number corresponding to a terminal GOP which specifies the reproduction in the AV stream, an RP number, and a frame number 1221 which finishes the reproduction in the GOP), are recorded as the information of the user defined program information no. r−1, and program incidental information 1222 is recorded as the incidental information in the recorded AV stream. Contents of program incidental information 1222 are the same as those of program incidental information 1134 shown in FIG. 11, and the program incidental information 2001 shown in FIG. 20. Furthermore, an index quantity 1214, an ALU number, and an RP number of an index specification position in the ALU, of an AV stream corresponding to the user defined program information no. r−1, which shows a format, and a position of an index, for each individual index number, are disposed. The index being, in the same way as the previous original program information of FIG. 11, for example, specified position information in a case in which the user edits a program corresponding to the user defined program information no. r−1, and specifies a marking point specification, as long as the index has been specified, the operation such as causing the program corresponding to the original program information no. p−1, at the time of reproduction, to leap swiftly to the position specified by the index, is possible.

Figure 13:
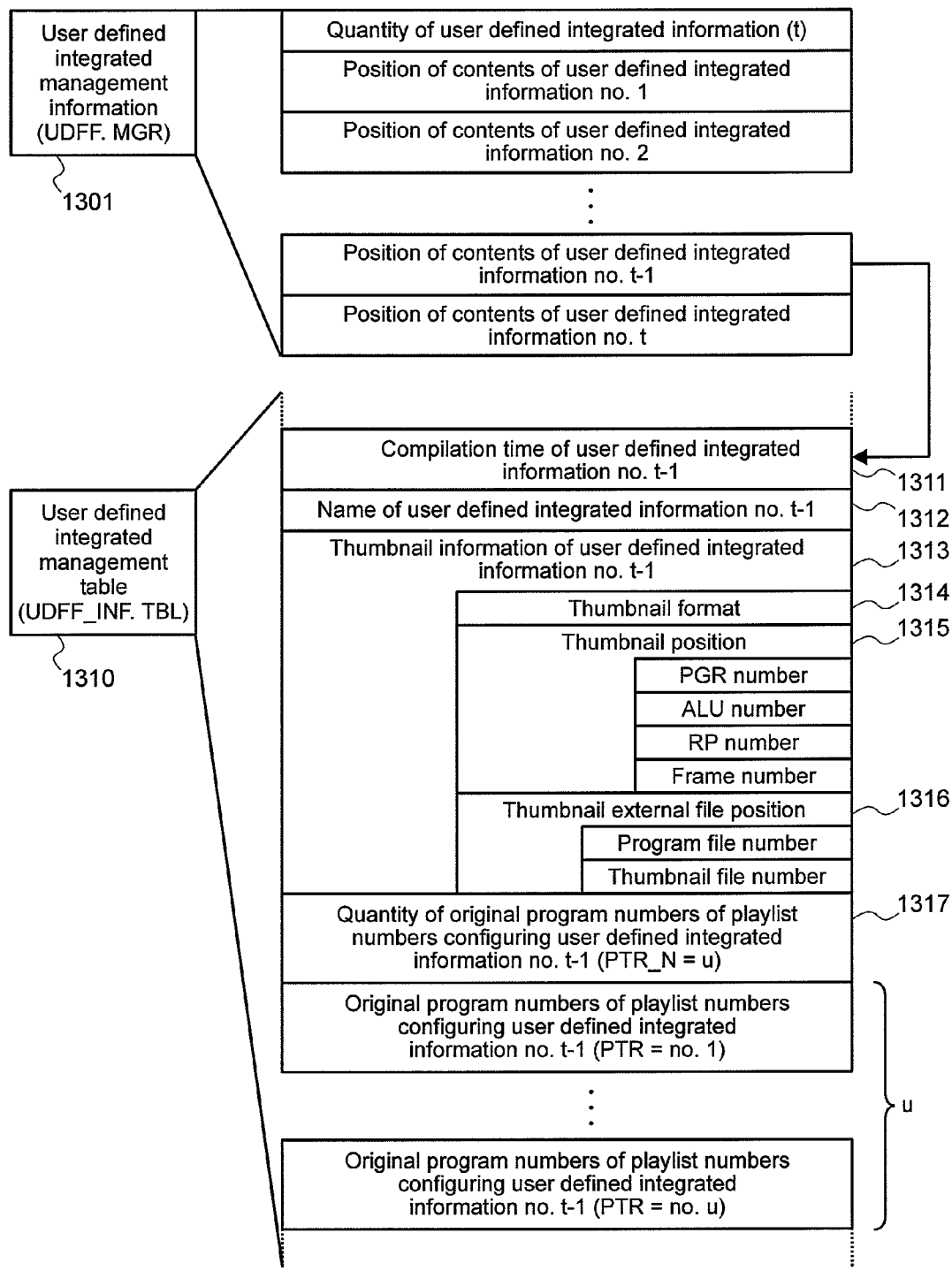
FIG. 13 shows one example of a configuration and management table of user defined integrated management information.

FIG. 13 shows contents of a user defined integrated management information (UDFF) file 1301 and a user defined integrated management table file 1310. The user defined integrated management information (UDFF) file 1301 corresponds to the UDFF.MGR 809 of FIG. 8, and the user defined integrated management table file 1310 to the UDFF_INF.TBL 810 of FIG. 8. A quantity of user defined integrated information which the user has registered by editing (a case of t in FIG. 13), and information on positions in the user defined integrated information table file 1310 (for example, information on how many bytes from a head of the user defined integrated management table file UDFF_INF.TBL 1310) in which are recorded contents of following user defined integrated information no. 1, user defined integrated information no. 2 ... user defined integrated information no. t−1, and user defined integrated information no. t, are recorded in the user defined integrated management information file 1301.

A table portion of the user defined integrated information no. t−1 is shown as a detailed example of the user defined integrated management table 1310 of FIG. 13. Information of the user defined integrated information no. t−1 is configured of a compilation time 1311 in which the user defined integrated information has been compiled, a name 1312 of the user defined integrated information, thumbnail information 1313 which represents the user defined integrated information, a quantity 1317 of original program numbers or playlist numbers which configure the user defined integrated information and, following this, a sequence of the original program numbers or playlist numbers which configure the user defined integrated information.

A thumbnail format 1314, a thumbnail position 1315, and a thumbnail external file position 1316, which are components of the thumbnail information 1313, have the same kind of data structure as the thumbnail format 1014, the thumbnail position 1015, and the thumbnail external file position 1016 in the previous playlist management table 1010 of FIG. 10.

Figure 16:
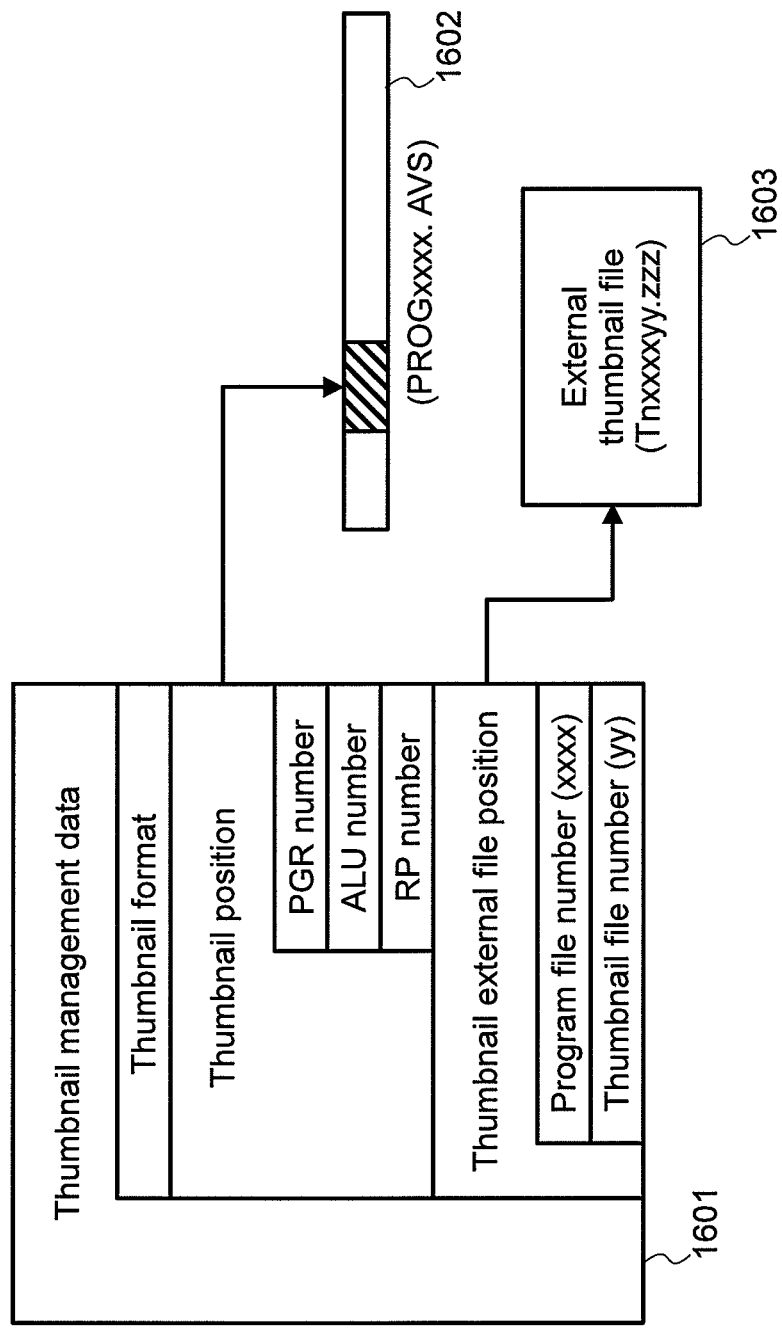
FIG. 16 illustrates thumbnail management information.

FIG. 16 is a diagram showing a correlation between a thumbnail management data structure and the external thumbnail file. In the same figure, thumbnail management data 1601, being configured of the thumbnail format, the thumbnail position and the thumbnail external file position, are the same as the thumbnail information 1013 of FIG. 10, the thumbnail information 1115 of FIG. 11, and the thumbnail information 1313 of FIG. 13. The thumbnail position being configured of a number of a program file 1602 program information (PGR), an ALU number corresponding to a position of an AV stream displayed as a thumbnail, and an RP number in an ALU corresponding to the ALU number, thumbnail external file information is configured of a program file number xxxx and a thumbnail file number yy.

Figure 17:
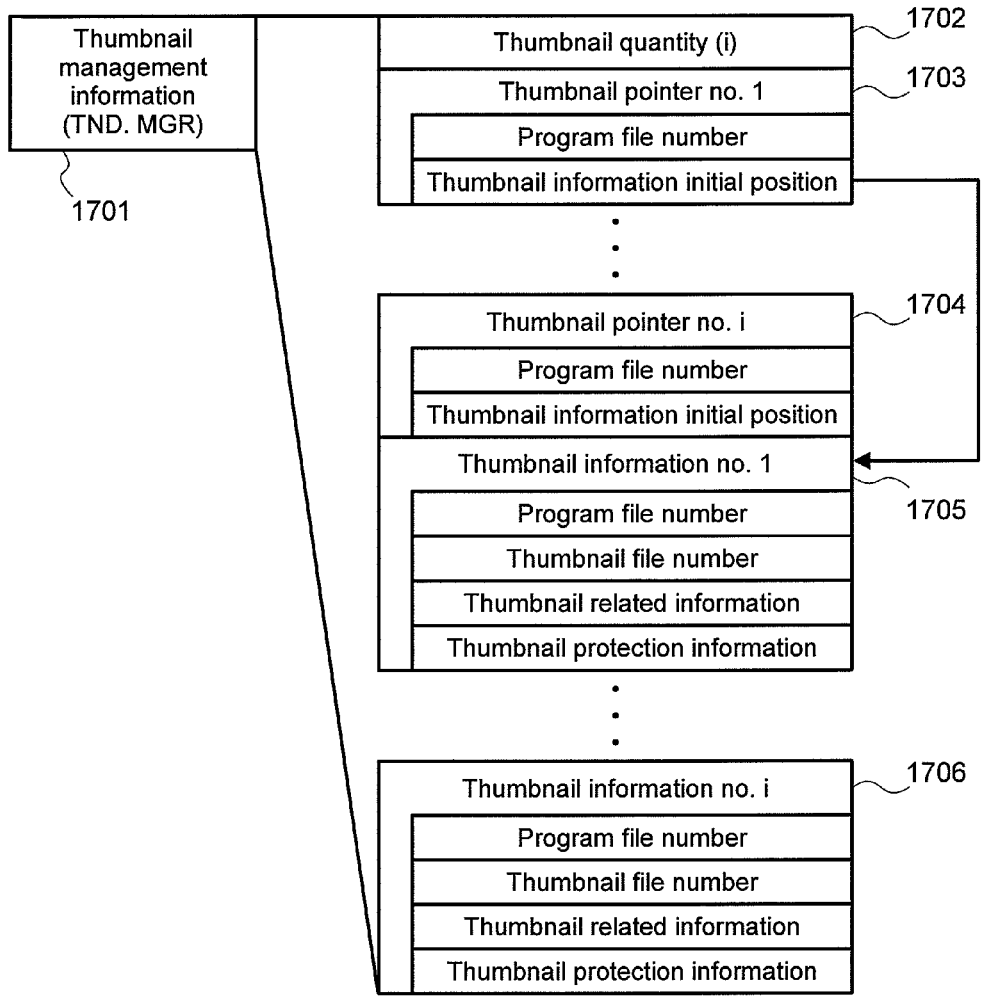
FIG. 17 shows a configuration and management table of management information which has integrated thumbnails.

FIG. 17, showing a structure of an all thumbnail management information file 1701, corresponds to the TND.MGR 831 of FIG. 8. Information which integrates the thumbnails is configured of a quantity of registered thumbnails (a case of i in the figure) 1702, thumbnail pointers 1703 and 1704, which have as information a pointer value of a place which contains information on a subsequently registered quantity's worth of thumbnails, and the like, and following this, each item of thumbnail information 1705 to 1706. Each item of thumbnail information 1705 to 1706 is configured of information on a program file number, a thumbnail file number, thumbnail related information (such as a vertical and horizontal pixel size of the thumbnail, and a compression method), and thumbnail protection information (a possibility or otherwise of an encoding of the thumbnail). As long as the thumbnail information is gathered in one place in this way, as it is possible to ascertain all the thumbnail information simply by referring to the all thumbnail management information file 1701, there is an advantage of being able to accelerate an operation in a case of acquiring a thumbnail information list or the like with a reproduction machine or the like according to the invention.

Figure 15:
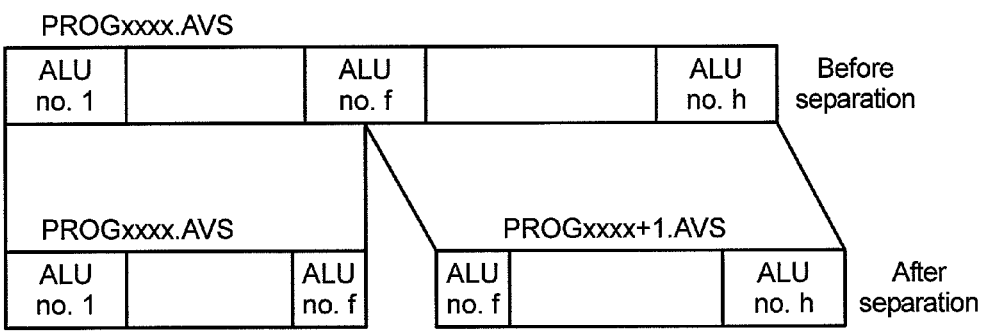
FIG. 15 shows a process of a separation time of the AV stream file.

FIG. 15 is a schematic diagram showing in what way a management of a program file which contains an AV stream is carried out, in a case in which, for example, the user separates one program in an editing operation (for example, a case in which one recorded program is separated into two). As shown in the same figure, an AV stream of an optional PROGxxxx-.AVS file is disposed in ALU units. Because of this, although it would be simple to separate in the ALU units, when extrapolating the ALU units to a reproduction time of the recorded AV stream, they become units of several tens of seconds, and a separation accuracy becomes extremely poor. For this reason, it is arranged in such a way that, in a separation point, it can be done by RP units. In this case, as shown in FIG. 15, the separation is done at an ALU number no. f portion. Then, AV streams of ALU no. 1 to ALU no. f of the separated file are newly taken as PROGxxxx.AVS, and AV streams of ALU no. f to ALU no. h taken as PROGxxx+1.AVS (1 is added to the file number xxxx), and recorded. In this case, as an ALU value of a stream portion terminus of the PROGxxxx.AVS after separation does not reach the prescribed 8,192 RP (shown in FIG. 14), at the same time as changing a "program ALU quantity", which is a parameter of the ALU management information 1403 of FIG. 14, a "final ALU RP quantity" is changed to an RP quantity after separation, that is, an RP quantity before a point at which the ALU no. f has been separated, and the file PROGxxxx.AVS is updated. Also, with respect to the AV stream of PROGxxxx+1.AVS (FIG. 15) after separation too, at the same time as changing the "program ALU quantity", which is a parameter of the ALU management information 1403 of FIG. 14, a "first ALU RP quantity" is changed to an RP quantity after separation, that is, an RP quantity after the point at which the ALU no. f has been separated, and recorded. By so doing, an accuracy of the separation point improves. At least, in the event that the separation point is an MPEG compressed AV stream, a separation at an accuracy of a GOP (Group of Picture) unit is possible.

Figure 18:
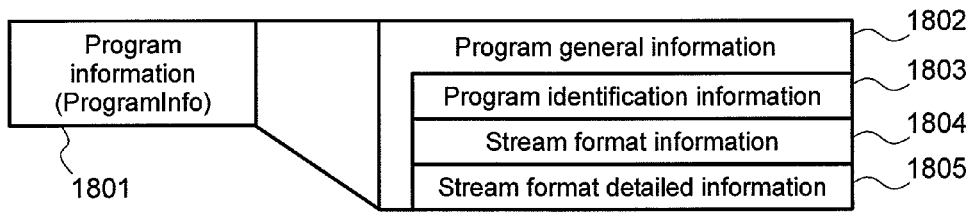
FIG. 18 shows contents of named stream ProgramInfo 824 in FIG. 8.

FIG. 18, being program information 1801, shows contents of the previous named stream ProgramInfo 824 in FIG. 8. In the same figure, program general information 1802 of the original program of the recorded AV stream is program identification information 1803 informing of a recording in the recording format of the embodiment, as well as stream format information 1804, which is identification information such as, as a kind of AV stream of the recorded original program, for example, the digital broadcast (Japan, Europe, North America etc.) or an AV stream self-encoded in the recording machine, and stream format detailed information 1805, configured of a recording starting time and finishing time, a program name and type, and the like.

Figure 19:
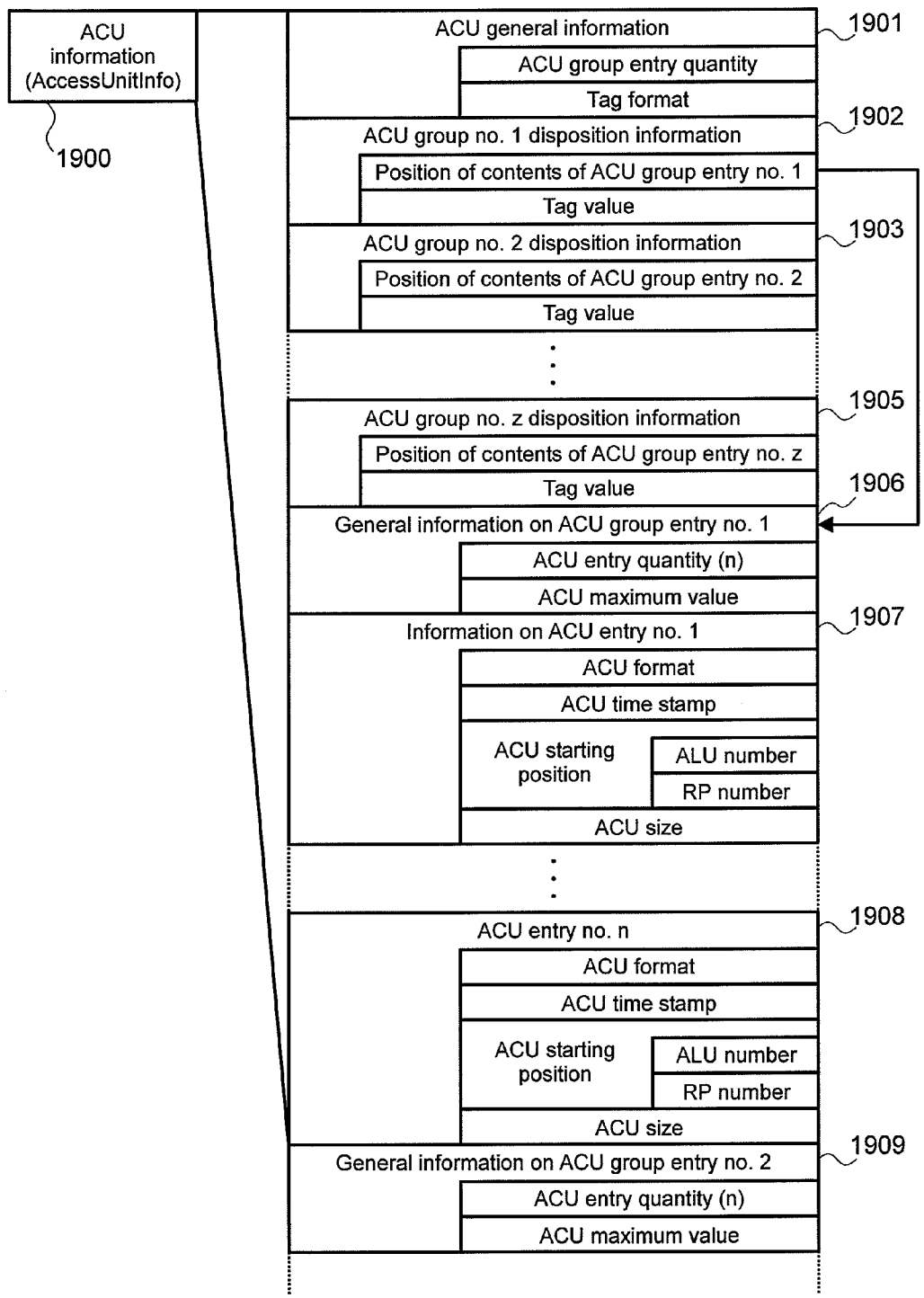
FIG. 19 shows details of ACU information 1900.

FIG. 19 shows contents of ACU information 1900, and the ACU information 1900 shows contents of the named stream AccessUnitInfo 825 of FIG. 8. The ACU has as information an ALU number and an RP number (FIG. 14) of a portion of an AV stream in which a GOP is positioned, as well as an RP quantity corresponding to a length of an I picture in an MPEG standard in the GOP, and the like. In the same figure, ACU general information 1901 has an ACU group entry quantity as an ACU group quantity, and a tag format in the AV stream. Hereafter, a description will be given of a value recorded in the tag format.

For example, with a European or Japanese digital broadcast, there is a value which represents a category of information with a stream configuration, necessary in order to reproduce a program corresponding to the relevant ACU 1900, called a component tag. When using the component tag, assuming a case in which one program has a plurality of streams, or the like, in service information (hereafter referred to as SI), information on, for example, a case in which there are not only one kind, but a plurality of kinds (one with a different filming angle, or the like) of image in the program, or there are a plurality of sounds (hereafter, this kind of AV stream, in which there are a plurality of images or sounds in one program, will be referred to as a multi-AV stream), or the like, is superimposed as component tags, and these can be used when put into an electronic program table and displayed to the user. Therein, in, for example, the European or Japanese digital broadcast, by recording the component tag in the tag format, even in the event that one program has the plurality of streams, it is possible to respond accordingly.

However, in broadcast regulations of the United States of America, or the like, there is a case in which this kind of component tag regulation is not being done.

Therein, it will be defined in such a way that, in a case in which an AV stream is recorded in which the component tag is regulated, as in, for example, the European or Japanese digital broadcast, 00H (H is a suffix representing a hexadecimal number) is recorded in the tag format, while in a case in which an AV stream is recorded in which the component tag is not regulated, as in, for example, the American broadcast regulations, 01H is recorded in the tag format.

By configuring the management file in this way, including a case in which the component tag is decided by a broadcast area, a case in which it is not, and the like, it is possible to respond as a recording/reproducing method.

Although, in the embodiment, a table is configured in order to be able to manage ACU entries of a plurality of groups in the heretofore described case in which the multi-stream is recorded, in a normal case, one ACU group for one AV stream is sufficient. Following this, information on a position in which contents of an ACU group entry no. 1 are disposed (for example, how many bytes from a first byte of the ACU information 1900 the contents of the ACU group entry no. 1 are disposed at), ACU group no. 1 disposition information 1902 which records a value of a component tag corresponding to a stream of the ACU group entry no. 1, and continuing on, ACU group no. 2 disposition information 1903, . . . , ACU group no. z disposition information 1905, are recorded. A tag value of each of ACU group nos. 1 to z disposition information being a component which represents a configuration of the AV stream (also referred to as component information), in the case in which a plurality of streams exist in one program, information indicating which AV stream the relevant ACU group nos. 1 to z disposition information corresponds to is recorded. Continuing further, general information 1906 of the ACU group entry no. 1 (configured of a total quantity of ACU's recorded in the ACU group entry no. 1 (an ACU entry quantity), and a maximum value of the ACU's recorded in the ACU group entry no. 1), and continuing on, information 1907 of an ACU entry no. 1, . . . , information 1908 of an ACU entry no. n, general information of the ACU group entry no. 2, . . . and so on are recorded. The information 1907 of the ACU entry no. 1, . . . , the information 1908 of the ACU entry no. n are each configured of an ACU format configured by having, as a flag, an existence or otherwise of a sequence header (MPEG standard) as a configuration of the GOP, an existence or otherwise of a GOP header, a category of a picture which configures the ACU (an MPEG standard I picture/P picture; only the I picture is assumed in the embodiment), and the like, an ACU time stamp, a certain ALU number of the GOP corresponding to an ACU entry number, as an ACU starting position, an RP number in the ALU, and an ACU size determined by a packet quantity of the I picture.

By configuring the information 1900 of the ACU in this way, as it is possible to ascertain position information of the I picture of the stream at the reproduction time, it is not only possible to use it in a process in a case of carrying out a high speed search at the reproduction time while displaying the I picture being caused to jump at a prescribed interval, and the like, but also to ascertain, at the reproduction time, information on a stream to be high-speed searched in accordance with a tag value of the component tag.

Also, in the case in which the stream recorded by the tag format of the ACU general information 1901 does not have a component tag regulation (01H or more in the heretofore described embodiment), information specified by a PMT (Program map Table: MPEG standard) in the AV stream is indicated. That is, in the event that the tag value=n, an nth stream described by the PMT is indicated. By so doing, even in the event that the component tag is not decided by the broadcast area, it is possible to record which stream, among the plurality thereof, the ACU general information corresponds to.

As above, according to the recording/reproducing device of the invention, the usability improves. For example, advantages of the following kinds of usability improvement are achieved.

As it is possible for the user to select and manage an optional playlist or a reproduction range, even in the case in which a plurality of users share a single recording medium, or the like, it being possible for each user to manage the preferred reproduction contents, the usability improves and, as the playlists are integratedly managed, it is possible for the user to freely change a display order etc. of the playlists.

Also, the user can reproduce from the resume point of the program reproduction and playlist reproduction, regardless of a reproduction condition of the playlist reproduction, program reproduction and the like.

Also, when the user carries out a desired navigation display, a reproduction machine can display the thumbnail list quickly.

Also, with a GOP number and frame number recorded as an editing point as a base, it becoming possible to supply a portion of the relevant GOP to a decoder, and control which editing point frame's information a reproduction display is based on, it is possible to easily carry out the reproduction control.

Also, as the incidental information in the AV stream is recorded in a separate management file at the reproduction time, it is easy to read it, and carry out the reproduction control.

While we have shown and described several embodiments in accordance with our invention, it should be understood that disclosed embodiments are susceptible to changes and modifications without departing from the scope of the invention. Therefore, we do not intend to bound by the details shown and described herein, but intend to cover all such changes and modifications as fall within the ambit of the appended claims.

What is claimed is:

1. An image and sound stream recording method having operations effected at least in part via circuitry, the image and sound stream recording method comprising operations of:
   recording an image and sound stream on a recording medium, and
   recording management information which manages the image and sound stream,
   wherein the management information has an image information position in the image and sound stream, and a component of the image and sound stream corresponding to the image information position,
   the management information includes an ACU information for one program containing a plurality of image and sound streams, the ACU information having the image information position in the image and sound stream,
   the ACU information for the one program has at least an ACU group entry quantity and a plurality of disposition information of an ACU group, the disposition information of the ACU group indicating disposition of the ACU group, and
   each of the disposition information of the ACU group includes at least tag value of the component of the image and sound stream.

2. The image and sound stream recording method according to claim 1, wherein
   the image information position is an image information position for a specific reproduction, and
   image information of the image and sound stream is an I picture or a P picture.

3. The image and sound stream recording method according to claim 1, wherein
   in the event that there is no regulation of the component tag, as the component of the image and sound stream, a component regulated by a program map table in the image and sound stream is recorded.

4. The image and sound stream recording method according to claim 1, wherein the management information has information on an ACU entry, and
   the information on the ACU entry has information about an ACU starting position and an ACU size, and information about an ALU number and an RP number of the ACU starting position.

5. The image and sound stream recording method according to claim 1, wherein the management information has a user defined integrated management table,
   wherein the user defined integrated management table has:
   an ALU number which indicates an ALU including a GOP displayed as a thumbnail, the ALU number being a minimum unit when recording the image and sound stream which have been encoded,
   an RP number which indicates a RP corresponding to the GOP, and
   a frame number which indicates a frame displayed as a thumbnail of the GOP.

6. An image and sound stream recording method having operations effected at least in part via circuitry, the image and sound stream recording method comprising operations of:
   recording an image and sound stream on a recording medium, and
   recording management information which manages the image and sound stream,
   wherein the management information has an image information position in the image and sound stream, and a component of the image and sound stream corresponding to the image information position,
   the management information includes an ACU information for one program of the image and sound stream, the one program having plural image streams and plural sounds streams representing components to provide differing presentations of a same program portion, the ACU information having the image information position in the image and sound stream,
   the ACU information of an ACU group for the one program has at least an ACU group entry quantity and a plurality of disposition information, the disposition information of the ACU group indicating disposition of the ACU group, and
   plural disposition information of the ACU group, each includes at least a tag value of a respective component of the image and sound stream.

* * * * *